United States Patent
Kim et al.

(10) Patent No.: US 8,269,372 B2
(45) Date of Patent: Sep. 18, 2012

(54) PHOTOVOLTAIC AND FUEL CELL HYBRID GENERATION SYSTEM USING DUAL CONVERTERS AND SINGLE INVERTER AND METHOD OF CONTROLLING THE SAME

(75) Inventors: Jin Wook Kim, Seoul (KR); Chung Yuen Won, Gyunggi-do (KR); Jong Soo Kim, Gyunggi-do (KR); Byoung Kuk Lee, Gyunggi-do (KR); Gyu Yeong Choe, Gyunggi-do (KR); Hee Sung Moon, Gwangju (KR); Jeong Min Ko, Jaeju-do (KR); Dong Seong Oh, Incheon (KR); Tae Won Lee, Gyunggi-do (KR); Jae Sun Won, Gyunggi-do (KR)

(73) Assignees: Samsung Electro-Mechanics Co., Ltd., Gyunggi-do (KR); Sungkyunkwan University Foundation for Corporate Collaboration, Gyunggi-do (KR)

( * ) Notice: Subject to any disclaimer, the term of this patent is extended or adjusted under 35 U.S.C. 154(b) by 259 days.

(21) Appl. No.: 12/643,117

(22) Filed: Dec. 21, 2009

(65) Prior Publication Data
US 2010/0156186 A1   Jun. 24, 2010

(30) Foreign Application Priority Data

Dec. 23, 2008   (KR) .................. 10-2008-0132665
Dec. 3, 2009   (KR) .................. 10-2009-0118904

(51) Int. Cl.
*H02J 1/00* (2006.01)
(52) U.S. Cl. .................. 307/72; 322/9; 700/291
(58) Field of Classification Search .................. 307/72, 307/82
See application file for complete search history.

(56) References Cited

U.S. PATENT DOCUMENTS

| | | | |
|---|---|---|---|
| 2005/0275386 A1* | 12/2005 | Jepsen et al. | 322/9 |
| 2007/0243425 A1* | 10/2007 | Spaner | 429/12 |
| 2009/0067202 A1* | 3/2009 | Ichikawa et al. | 363/79 |
| 2009/0076661 A1* | 3/2009 | Pearson et al. | 700/291 |

FOREIGN PATENT DOCUMENTS

| | | |
|---|---|---|
| JP | 06-266455 A | 9/1994 |
| JP | 2002199592 A | 7/2002 |
| JP | 2003250222 A | 9/2003 |
| KR | 1020080077161 A | 8/2008 |

OTHER PUBLICATIONS

Korean Office Action for 10-2009-0118904 dated Mar. 18, 2011.

\* cited by examiner

*Primary Examiner* — Rexford Barnie
*Assistant Examiner* — Toan Vu
(74) *Attorney, Agent, or Firm* — Lowe, Hauptman, Ham & Berner, LLP

(57) ABSTRACT

There is provided a photovoltaic and fuel cell hybrid generation system using dual converters and a single inverter and a method of controlling the same. A photovoltaic and fuel cell (PV-FC) hybrid generation system according to an aspect of the invention may include: a PV DC/DC converter unit converting a PV output voltage into a predetermined voltage; an FC DC/DC converter unit converting an FC output voltage into a predetermined voltage; a DC link unit commonly connecting an output terminal of the PV DC/DC converter unit and an output terminal of the FC DC/DC converter unit, and linking the converted PV output voltage from the PV DC/DC converter unit to the converted FC output voltage from the FC DC/DC converter unit to thereby generate a DC voltage; and a DC/AC inverter unit converting the DC voltage from the DC link unit into a predetermined AC voltage.

22 Claims, 8 Drawing Sheets

PHOTOVOLTAIC AND FUEL CELL HYBRID GENERATION SYSTEM USING DUAL CONVERTERS AND SINGLE INVERTER AND METHOD OF CONTROLLING THE SAME

CROSS-REFERENCE TO RELATED APPLICATIONS

This application claims the priority of Korean Patent Application No. 10-2008-0132665 filed on Dec. 23, 2008 and the priority of Korean Patent Application No. 10-2009-0118904 filed on Dec. 3, 2009, in the Korean Intellectual Property Office, the disclosure of which is incorporated herein by reference.

BACKGROUND OF THE INVENTION

1. Field of the Invention

The present invention relates to a photovoltaic and fuel cell hybrid generation system and a method of controlling the same, and more particularly, to a photovoltaic and fuel cell hybrid generation system that can reduce the number of expensive inverters and a method of controlling the same.

2. Description of the Related Art

Since the late $20^{th}$ century, the demand for developing renewable energy sources has increased due to the depletion of fossil fuels, and the environmental pollution and global warming associated with $CO_2$, $NO_x$ and $SO_x$ emissions. Notably, the demand for renewable energy technology has recently increased sharply due to soaring international oil prices and greenhouse gas reductions obligated by the Kyoto protocol. Thus, matters regarding current energy resources are linked directly to national security, and the volition and technology to reduce $CO_2$ emissions are considered to significantly affect a nation's competitiveness.

Among a variety of renewable energy sources, solar cells (i.e., photovoltaic cells: PV), despite low efficiency, are expanding their domestic market share due to capacity for infinite clean energy and their advantages conforming with Korean domestic semiconductor technologies. In overseas markets, the commercialization of photovoltaic generation systems, led by Japan and German, has been completed based on those countries' long-term accumulated technical skills and financial abilities.

However, photovoltaic cells have the following limitations: generating power only in the daytime, working as intermittent generation sources dependent upon environmental conditions such as cloud cover and rain, and having the very low maximum efficiency of approximately 10% to 15%. For this reason, photovoltaic cells for home use are utilized only during the daytime, and the commercial power grid supplies power at night and under environmental limitations.

To prevent the above limitations, hybrid generation systems, such as PV-Battery, PV-Wind, PV-Diesel or PV-FC hybrid systems, are under development mainly in the world's leading technological nations. It is therefore currently considered important for nations to take the lead in hybrid power generation system technologies and markets.

However, PV-Battery hybrid systems are disadvantageous in that a battery is not a power generation device, but rather a secondary cell having a short useful lifespan that causes pollution during the manufacturing and discarding process. PV-Wind hybrid systems also have disadvantages in that a wind power generation source is an intermittent power generation source that is dependent upon environmental conditions, and is not suitable for home use due to its restrictions in terms of installation space and noise. As for PV-Diesel hybrid systems, a fossil fuel needs to be used and this places a limit on its development into an ultimate future power generation system.

A PV-FC hybrid system is considered to be the most competitive generation system as a future hybrid generation source due to the following reasons: this hybrid generation system uses hydrogen and oxygen as fuel, both of which are infinite clean energy sources, conforming with the hydrogen economy society at which the government is aiming, has sufficiently high generation efficiency (35% to 80% in Combined Heat and Power (CHP)), and utilizes a fuel cell that is capable of constant power generation. In the PV-FC hybrid system, a fuel cell constantly generates power so as to maintain a basic load, and PV power is supplied to the grid during the daytime. Thereafter, water is subjected to electrolysis using surplus PV power to thereby generate hydrogen, and the generated hydrogen is used as the fuel of the fuel cell. Consequently, the PV-FC hybrid system can advantageously serve as ultimate eco-friendly infinite energy sources.

Since photovoltaic (PV) cells and fuel cells (FC) have different output characteristics from each other, the photovoltaic and fuel cell hybrid generation system is configured to have two converters and two inverters, that is, a 2CON-2INV structure including a converter and an inverter for a PV cell and a converter and an inverter for a fuel cell. This 2CON-2INV structure, however, causes increases in system size and manufacturing costs, obstructing the realization of a practical hybrid generation system.

SUMMARY OF THE INVENTION

An aspect of the present invention provides a photovoltaic and fuel cell hybrid generation system using dual converters and a single inverter, capable of achieving a reduction in the number of expensive inverters to thereby reduce system size and manufacturing costs and realize an efficient system configuration, and a method of controlling the same.

According to an aspect of the present invention, there is provided a photovoltaic and fuel cell (PV-FC) hybrid generation system including: a PV DC/DC converter unit converting a PV output voltage from a photovoltaic voltage into a predetermined voltage; an FC DC/DC converter unit converting an FC output voltage from a fuel cell into a predetermined voltage; a DC link unit commonly connecting an output terminal of the PV DC/DC converter unit and an output terminal of the FC DC/DC converter unit, and linking the converted PV output voltage from the PV DC/DC converter unit to the converted FC output voltage from the FC DC/DC converter unit to thereby generate a DC voltage; and a DC/AC inverter unit converting the DC voltage from the DC link unit into a predetermined AC voltage.

The DC link unit may include a capacitor connected between a ground and a common connection node commonly connected to the output terminal of the PV DC/DC converter unit and the output terminal of the FC DC/DC converter unit.

The DC/AC inverter unit may include: a DC/AC inverter converting the DC voltage from the DC link unit into a pulsed DC voltage; a filter converting the pulsed DC voltage from the DC/AC inverter into the AC voltage; and a grid transmitter transmitting the AC voltage from the filter to a grid.

According to another aspect of the present invention, there is provided a PV-FC hybrid generation system including: a PV DC/DC converter unit converting a PV output voltage from a photovoltaic cell into a predetermined voltage; an FC DC/DC converter unit converting an FC output voltage from a fuel cell into a predetermined voltage; a DC link unit commonly connecting an output terminal of the PV DC/DC converter unit and an output terminal of the FC DC/DC converter unit, and linking the converted PV output voltage from the PV DC/DC converter unit to the converted FC output voltage from the FC DC/DC converter unit to thereby generate a DC voltage; a DC/AC inverter unit converting the DC voltage from the DC link unit into a predetermined AC voltage; a voltage/current detection unit detecting a plurality of voltages and currents generated by the fuel cell, the photovoltaic cell, and the DC/AC inverter unit, and detecting output voltages from the PV DC/DC converter unit and the FC DC/DC converter unit; and a hybrid generation control unit controlling operations of the PV DC/DC converter unit, the FC DC/DC converter unit, and the DC/AC inverter unit on the basis of the plurality of voltages and currents detected by the voltage/current detection unit.

The DC link unit may include a capacitor connected between a ground and a common connection node commonly connected to the output terminal of the PV DC/DC converter unit and the output terminal of the FC DC/DC converter unit.

The DC/AC inverter unit may include: a DC/AC inverter converting the DC voltage from the DC link unit into a pulsed voltage; a filter converting the pulsed DC voltage from the DC/AC inverter into the AC voltage; and a grid transmitter transmitting the AC voltage from the filter to a grid.

The voltage/current detection unit may include the FC output voltage and output current from the fuel cell, the PV output voltage and output current from the photovoltaic cell, output currents from the PV DC/DC converter unit and the FC DC/DC converter unit, the DC voltage from the DC link unit, the AC voltage and output current from the DC/AC inverter unit, and a grid voltage from a grid of a commercial power supply.

The hybrid generation control unit may include: a PV converter controller controlling the operation of the PV DC/DC converter unit, using the DC voltage and the output current from the PV DC/DC converter unit; an FC converter controller controlling the operation of the FC DC/DC converter unit, using the DC voltage and the output current from the FC DC/DC converter unit; and an inverter controller controlling the operation of the DC/AC inverter unit on the basis of the PV output voltage and the output current from the voltage/current detection unit.

The PV converter controller, the FC converter controller, and the inverter controller each may determine a photovoltaic generation status according to a PV power obtained by calculation using the PV output voltage and the output current from the photovoltaic cell after a grid-connected operation starts, and perform one of predetermined first and second grid-connected control modes according to the determined photovoltaic generation status, wherein the first grid-connected control mode is a control mode when photovoltaic generation is not being carried out in a grid-connected operation mode, and the second grid-connected control mode is a control mode when photovoltaic generation is being carried out in the grid-connected operation mode.

The hybrid generation control unit may determine a photovoltaic generation status according to a PV power obtained by calculation using the PV output voltage and the output current from the photovoltaic cell after a grid-connected operation starts, and perform one of predetermined first and second grid-connected control modes according to the determined photovoltaic generation status, wherein the first grid-connected control mode is a control mode when photovoltaic generation is not being carried out in a grid-connected operation mode, and the second grid-connected control mode is a control mode when photovoltaic generation is being carried out in the grid-connected operation mode.

The PV converter controller may include: a first calculation part calculating a first control error value for constant voltage control on the PV DC/DC converter unit in the second grid-connected control mode; a first control value compensation part compensating a PV converter control value using the first control error value from the first calculation part; and a first PWM control part generating a PV PWM converter control signal, using the compensated PV converter control value from the first control value compensation part, and controlling the operation of the DC/DC converter unit, using the PV PWM converter control signal.

The FC converter controller may include: a second calculation part calculating a second control error value for constant current control on the FC DC/DC converter unit in the second grid-connected control mode; a second control value compensation part compensating an FC converter control value using the second control error value from the second calculation part; and a second PWM control part generating an FC PWM converter control signal using the compensated FC converter control value from the second control value compensation part, and controlling the operation of the FC DC/DC converter unit, using the FC PWM converter control signal.

The inverter controller may include: a maximum power point tracking part tracking a maximum power point with respect to the DC/AC inverter unit, using the output voltage and the output current from the photovoltaic cell, to generate a reference voltage in the second grid-connected control mode; a current command value calculation part generating a current command value using the reference voltage generated by the maximum power point tracking part; a current compensation value calculation part generating power by adding a predetermined FC power command value and a predetermined PV power command value, and generating a current compensation value by dividing the generated power by voltage set according to the grid voltage; a current compensation part compensating the current command value from the current command value calculation part, using the current compensation value from the current compensation value calculation unit; and a third PWM control part generating a PWM inverter control signal by calculation using a detection current and the current command value compensated by the current compensation part, and controlling the operation of the DC/AC inverter unit, using the PWM inverter control signal.

The first calculation part of the PV converter controller may perform PI control of a difference value between a predetermined DC voltage command value and the DC voltage to generate a DC command value, and calculate the first control error value corresponding to a difference value between the DC command value and the output current from the FC DC/DC converter unit in the second grid-connected control mode.

The second calculation part of the FC converter controller may generate an output current command value of an FC converter by dividing a predetermined power command value by the DC voltage, and calculate the second control error value corresponding to a difference value between the output current command value of the FC converter and the output current from the FC converter in the second grid-connected control mode.

The current command value calculation part of the inverter controller may perform PI control of a difference value between the PV output voltage and the reference voltage from the maximum power point tracking part to thereby generate a reference current, and perform PI control of a difference value between the reference current and the PV output current to thereby generate the current command value.

The PV converter controller may control termination of the operation of the PV DC/DC converter unit.

The FC converter controller may include: a second calculation part calculating a second control error value for constant voltage control on the FC DC/DC converter unit in the first grid-connected control mode; a second control value compensation part compensating an FC converter control value using the second control error value from the second calculation part; and a second PWM control part generating an FC PWM converter control signal using the compensated FC converter control value from the second control value compensation part, and controlling the operation of the FC DC/DC converter unit, using the FC PWM converter control signal.

The inverter controller may include: a current command value calculation part generating a current command value by dividing a predetermined FC power command value by voltage set according to the grid voltage for grid connection and output current control on the DC/AC inverter unit in the first grid-connected control mode; and a third PWM control part generating a PWM inverter control signal by calculation using a detection current and the current command value from the current command value calculation part, and controlling the operation of the DC/AC inverter unit, using the PWM inverter control signal.

The second calculation part of the FC converter controller may perform PI control of a difference value between a predetermined DC voltage command value and the DC voltage to thereby generate an output current command value of the FC converter, and calculate the second control error value corresponding to a difference value between the output current command value of the FC converter and the output current from the FC DC/DC converter unit in the first grid-connected control mode.

According to another aspect of the present invention, there is provided a method of controlling a photovoltaic and fuel cell (PV-FC) hybrid generation system having a PV DC/DC converter unit converting a PV output voltage from a photovoltaic cell into a predetermined voltage, an FC DC/DC converter unit converting an FC output voltage from a fuel cell into a predetermined voltage, a DC link unit linking the converted PV output voltage from the PV DC/DC converter unit to the converted FC output voltage from the FC DC/DC converter unit to thereby generate a DC voltage, and a DC/AC inverter unit converting the DC voltage from the DC link unit into a predetermined AC voltage, the method including: a system start operation in which voltage and current necessary to determine grid connection are detected, and it is determined whether grid connection is obtainable or not on the basis of the detected voltage; a grid-connected photovoltaic generation determination operation in which a grid-connected operation mode is performed when it is determined that the grid connection is obtainable, in order to determine a photovoltaic generation status by comparing a PV power obtained by calculation using the PV output voltage and output current from the photovoltaic cell with a predetermined minimum PV power; a first grid-connected control operation including a first converter control operation in which an operation of the PV DC/DC converter is terminated, a second converter control operation in which a constant voltage of the FC DC/DC converter unit is controlled, and an inverter control operation in which grid connection and output current control on the DC/AC inverter unit are performed, when it is determined that photovoltaic generation is not being carried out in a grid-connected operation mode in the grid-connected photovoltaic generation determination operation; and a second grid-connected control operation having a first converter control operation in which constant voltage control on the PV DC/DC converter unit is performed, a second converter control operation in which constant current control on the FC DC/DC converter unit is performed, and an inverter control operation in which maximum power point tracking, grid connection and output current control on the DA/AC inverter unit are performed.

In each of the system start operation, the first grid-connected control operation, and the second grid-connected control operation, the FC output voltage and output current may be detected from the fuel cell, the PV output voltage and output current may be detected from the photovoltaic cell, output currents may be detected from the PV DC/DC converter unit and the FC DC/DC converter unit, the DC voltage may be detected from the DC link unit, the AC voltage and output current may be detected from the DC/AC inverter unit, and a grid voltage may be detected from a grid of a commercial power supply.

The first converter control operation of the second grid-connected control operation may include: a first calculation operation in which a first control error value is calculated for constant voltage control on the PV DC/DC converter unit; a first control value compensation operation in which a PV converter control value is compensated using the first control error value calculated in the first calculation operation; and a first PWM control operation in which a PV PWM converter control signal is generated using the PV converter control value compensated in the first control value compensation operation, and the operation of the PV DC/DC converter unit is controlled using the PV PWM converter control signal.

The second converter control operation of the second grid-connected control operation may include: a second calculation operation in which a second control error value is calculated for constant current control on the FC DC/DC converter unit; a second control value compensation operation in which an FC converter control value is compensated using the second control error value calculated in the second calculation operation; and a second PWM control operation in which an FC PWM converter control signal is generated using the FC converter control value compensated in the second control value compensation operation, and the operation of the FC DC/DC converter unit is controlled using the FC PWM converter control signal.

The inverter control operation of the second grid-connected control operation may include: a maximum power point tracking operation in which maximum power point tracking with respect to the DC/AC inverter is performed using the output voltage and the output current from the photovoltaic cell to generate a reference voltage; a current command value calculation operation in which a current command value is generated using the reference voltage generated in the maximum power point tracking operation; a current compensation value calculation operation in which power is generated by adding a predetermined FC power command value and a predetermined PV power command value, and the power is divided by voltage set according to the grid voltage to generate a current compensation value; a current compensation operation in which the current command value calculated in the current command value calculation operation is compensated using the current compensation value calculated in the current command value calculation operation; and a third PWM control operation in which a PWM inverter control signal is generated by calculation using a detection current and the current command value compensated in the current compensation operation, and an operation of the DC/AC inverter is controlled using the PWM inverter control signal.

In the first calculation operation of the first converter control operation, PI control of a difference value between a predetermined DC voltage command value and the DC voltage may be performed to generate a DC command value, and the first control error value corresponding to a difference value between the DC command value and the output current from the PV DC/DC converter may be calculated.

In the second calculation operation of the second converter control operation, an output current command value of an FC converter may be generated by dividing a predetermined power command value by the DC voltage, and the second control error value corresponding to a difference value between the output current command value of the FC converter and output current from the FC converter may be calculated.

In the current command value calculation operation of the inverter control operation, PI control of a difference value between the PV output voltage and the reference voltage generated in the maximum power point tracking operation may be performed to generate a reference current, and PI control of a difference value between the reference current and the PI output current may be performed to generate the current command value.

The second converter control operation of the first grid-connected control operation may include: a second calculation operation in which a second control error value is calculated for constant voltage control on the FC DC/DC converter unit; a second control value compensation operation in which an FC converter control value is compensated using the second control error value calculated in the second calculation operation; and a second PWM control operation in which an FC PWM converter control signal is generated using the FC converter control value compensated in the second control value compensation operation, and the operation of the FC DC/DC converter unit is controlled using the FC PWM converter control signal.

The inverter control operation of the first grid-connected control operation may include: a current command value calculation operation in which a current command value is generated by dividing a predetermined FC power command value by voltage set according to the grid voltage for grid connection and output current control on the DC/AC inverter unit; and a third PWM control operation in which a PWM inverter control signal is generated by calculation using a detection current and the current command value calculated in the current command value calculation operation, and the operation of the DC/AC inverter unit is controlled using the PWM inverter control signal.

In the second calculation operation of the second converter control operation, PI control of a difference value between a predetermined DC voltage command value and the DC voltage may be performed to generate an output current command value of the FC converter, and the second control error value corresponding to a difference value between the output current command value of the FC converter and the output current form the FC DC/DC converter unit may be calculated.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
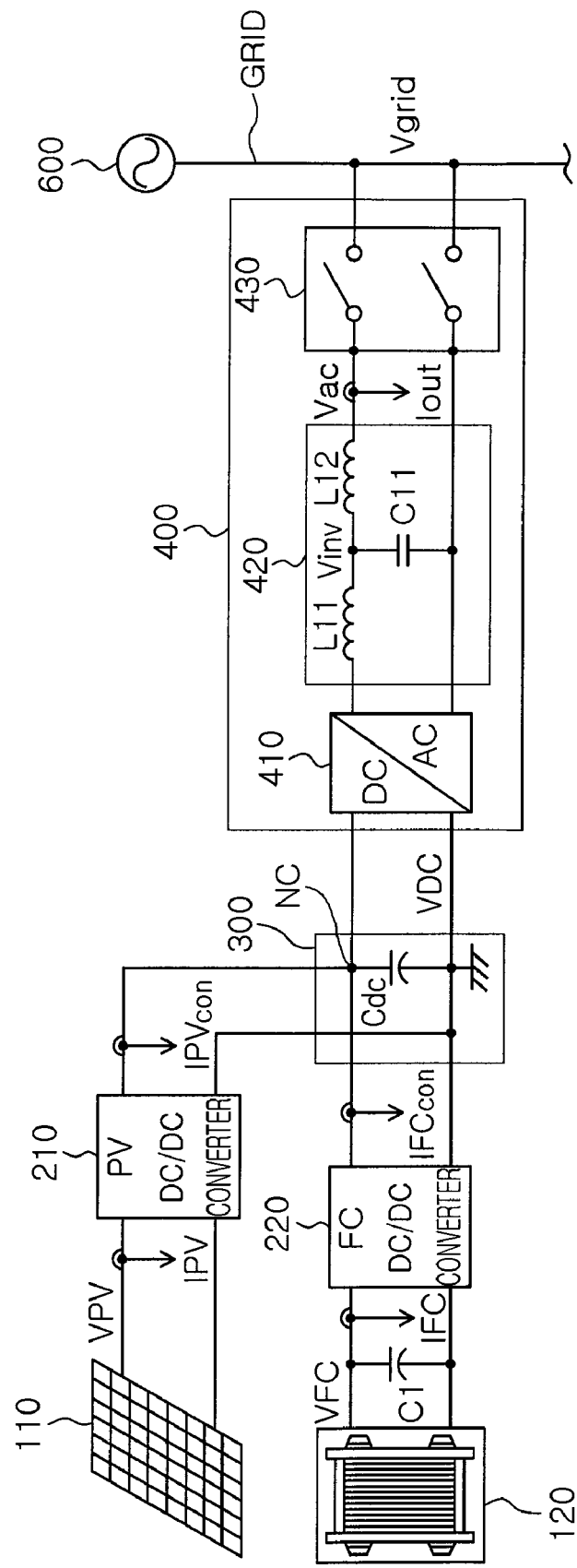
FIG. 1 is a circuit block diagram illustrating a photovoltaic and fuel cell (PV-FC) hybrid generation system using dual converters and a single inverter according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a circuit block diagram illustrating a photovoltaic and fuel cell hybrid generation system (hereinafter, also "PV-FC hybrid generation system") using dual converters and a single inverter according to an exemplary embodiment of the invention.

Referring to FIG. 1, the PV-FC hybrid generation system according to this embodiment includes a PV DC/DC converter unit 210, an FC DC/DC converter unit 220, a DC link unit 300 and a DC/AC inverter unit 400. The PV DC/DC converter unit 210 converts a PV output voltage VPV from a photovoltaic cell (i.e., a solar cell) 110, which converts the energy of sunlight directly into electrical energy, into a predetermined voltage. The FC DC/DC converter unit 220 converts an FC output voltage VFC from a fuel cell 120, which converts chemical energy into electrical energy, into a predetermined voltage. The DC link unit 300 commonly connects an output terminal of the PV DC/DC converter unit 210 and an output terminal of the FC DC/DC converter unit 220 and links the PV output voltage VPV, converted by the PV DC/DC converter unit 210, to the FC output voltage VFC, converted by the FC DC/DC converter unit 220, to thereby generate a DC voltage VDC. The DC/AC inverter unit 400 converts the DC voltage VDC from the DC link unit 300 into a predetermined AC voltage Vac.

Here, the photovoltaic cell 110 generates effective PV power through photovoltaic generation being carried out when there is sunlight during the daytime and cannot generate effective PV power when photovoltaic generation is not being carried out at night. That is, the photovoltaic cell 110 generates PV power, depending on whether or not there is sunlight. Therefore, the photovoltaic cell 110 needs to be controlled to generate maximum power by performing Maximum Power Point Tracking (MPPT) to track a maximum power point of power generated by the photovoltaic cell 110.

The fuel cell 120 converts chemical energy into electrical energy having a predetermined magnitude through an oxidation-reduction reaction of hydrogen and oxygen.

Figure 2:
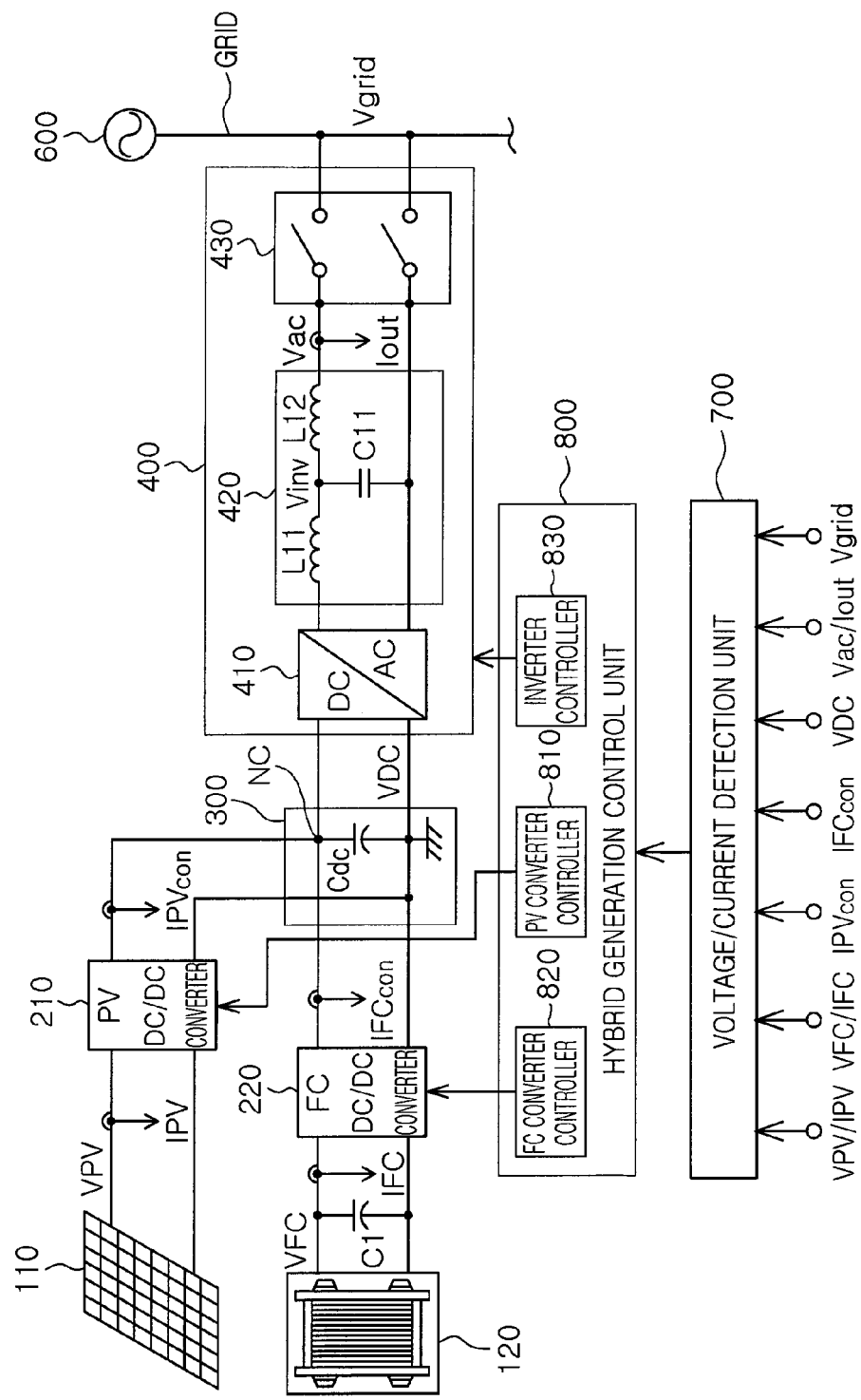
FIG. 2 is a circuit block diagram illustrating a PV-FC hybrid generation system using dual converters and a single inverter according to another exemplary embodiment of the present invention.

FIG. 2 is a circuit block diagram illustrating a PV-FC hybrid generation system using dual converters and a single inverter according to another exemplary embodiment of the invention.

Referring to FIG. 2, the PV-FC hybrid generation system according to this embodiment includes the PV DC/DC converter unit 210, the FC DC/DC converter unit 220, the DC link unit 300, the DC/AC inverter unit 400, a voltage/current detection unit 700 and a hybrid generation control unit 800. The PV DC/DC converter unit 210 converts a PV output voltage VPV from the photovoltaic cell 110, which converts the energy of sunlight into electrical energy, into a predetermined voltage. The FC DC/DC converter unit 220 converts an FC output voltage VFC from the fuel cell 120, which converts chemical energy into electrical energy, into a predetermined voltage. The DC link unit 300 commonly connects an output terminal of the PV DC/DC converter unit 210 and an output terminal of the FC DC/DC converter unit 220 and links the PV output voltage VPV, converted by the PV DC/DC converter unit 210, to the FC output voltage VFC, converted by the FC DC/DC converter unit 220, to thereby generate a DC voltage VDC. The DC/AC inverter unit 400 converts the DC voltage VDC from the DC link unit 300 into a predetermined AC voltage Vac. The voltage/current detection unit 700 detects the voltages and currents generated by the fuel cell 120, the photovoltaic cell 110 and the DC/AC inverter unit 400, and detects output currents IPVcon and IFCconPV of the DC/DC converter unit 210 and the FC DC/DC converter unit 220, respectively. The hybrid generation control unit 800 controls the operations of the PV DC/DC converter unit 210, the FC DC/DC converter unit 220 and the DC/AC inverter unit 400 on the basis of the plurality of voltages and currents detected by the voltage/current detection unit 700.

In the PV-FC hybrid generation systems according to the embodiments, shown in FIGS. 1 and 2, the DC link unit 300 may include a capacitor Cdc connected between a ground and a common connection node NC commonly connected to the output terminal of the PV DC/DC converter unit 210 and the output terminal of the FC DC/DC converter unit 220.

The DC/AC inverter unit 400 may include a DC/AC inverter 410, a filter 420 and a grid transmitter 430. The DC/AC inverter 410 converts the DC voltage VDC from the DC link unit 300 into a pulsed voltage. The filter 420 converts the pulsed voltage from the DC/AC inverter 410 into the AC voltage Vac. The grid transmitter 430 transmits the AC voltage Vac from the filter 420 to a grid when grid connection is required in order to transmit to power to a commercial power supply 600.

Here, the grid transmitter 430 may operate under the control of the hybrid generation control unit 800 to transmit the AC voltage Vac from the filter 420 to the grid.

The voltage/current detection unit 700 according to the embodiment, shown in FIG. 2, may detect the FC output voltage VFC and an output current IFC from the fuel cell 120, the PV output voltage VPV and an output current IPV from the photovoltaic cell 110, the output currents IPVcon and IFCcon from the PV DC/DC converter unit 210 and the FC DC/DC converter unit 220, respectively, the DC voltage VDC from the DC link unit 300, the AC voltage Vac and an output current Iout from the DC/AC inverter unit 400, and a grid voltage Vgrid from the grid of the commercial power supply 600.

The hybrid generation control unit 800 may include a PV converter controller 810, an FC converter controller 820, and an inverter controller 830. The PV converter controller 810 controls the operation of the PV DC/DC converter unit 210, using the DC voltage VDC and the output current IPVcon from the PV DC/DC converter unit 210. The FC converter controller 820 controls the operation of the FC DC/DC converter unit 220, using the DC voltage VDC and the output current IFCcon from the FC DC/DC converter unit 220. The inverter controller 830 controls the operation of the DC/AC inverter unit 400 on the basis of the PV output voltage VPV and the output current IPV detected by the voltage/current detection unit 700.

Figure 3:
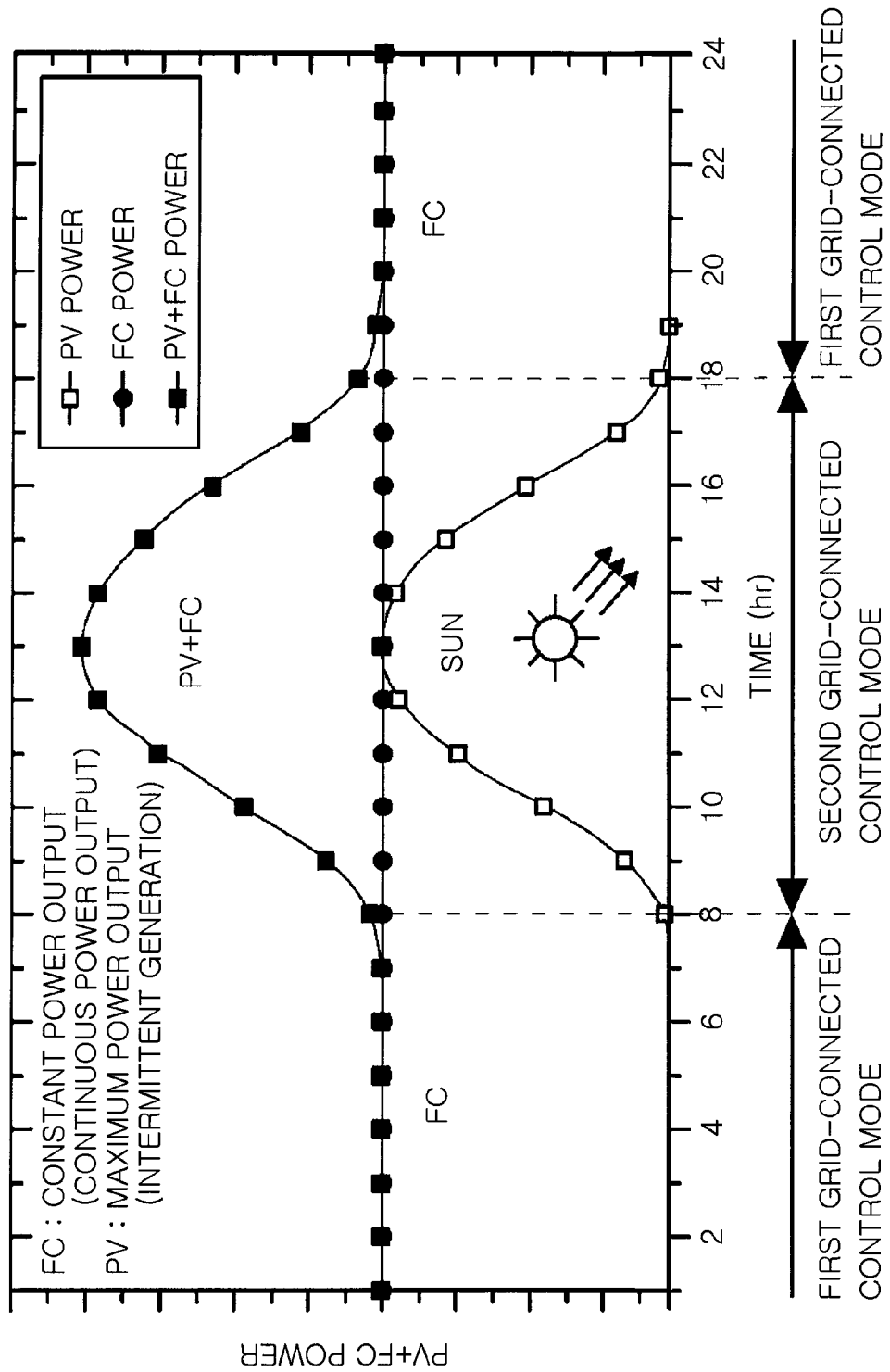
FIG. 3 is a view illustrating output characteristics during the grid-connected operation of a PV-FC hybrid generation system according to an exemplary embodiment of the present invention.

FIG. 3 is a view illustrating output characteristics when a PV-FC hybrid generation system performs grid-connected operation.

Referring to FIGS. 2 and 3, after a grid-connected operation starts, the hybrid generation control unit 800 determines a photovoltaic generation status on the basis of a PV power PPV obtained by calculation using the PV output voltage VPV and the output current IPV from the photovoltaic cell 110. The hybrid generation control unit 800 performs one of predetermined first and second grid-connected control modes according to the determined photovoltaic generation status. Here, as for a grid-connected operation mode, the first grid-connected control mode is performed when photovoltaic generation is not being carried out, while the second grid-connected control mode is performed when photovoltaic generation is being carried out.

More specifically, after the grid connected operation starts, each of the PV converter controller 810, the FC converter controller 820 and the inverter controller 830 determines a photovoltaic generation status according to the PV power PPV obtained by calculation using the PV output voltage VPV and the output current IPV from the photovoltaic cell 110, and performs one of the predetermined first and second grid-connected control modes according to the determined photovoltaic generation status. Here, as for a grid-connected operation mode, the first grid-connected control mode is performed when photovoltaic generation is not being carried out, while the second grid-connected control mode is performed when photovoltaic generation is being carried out.

Figure 4:
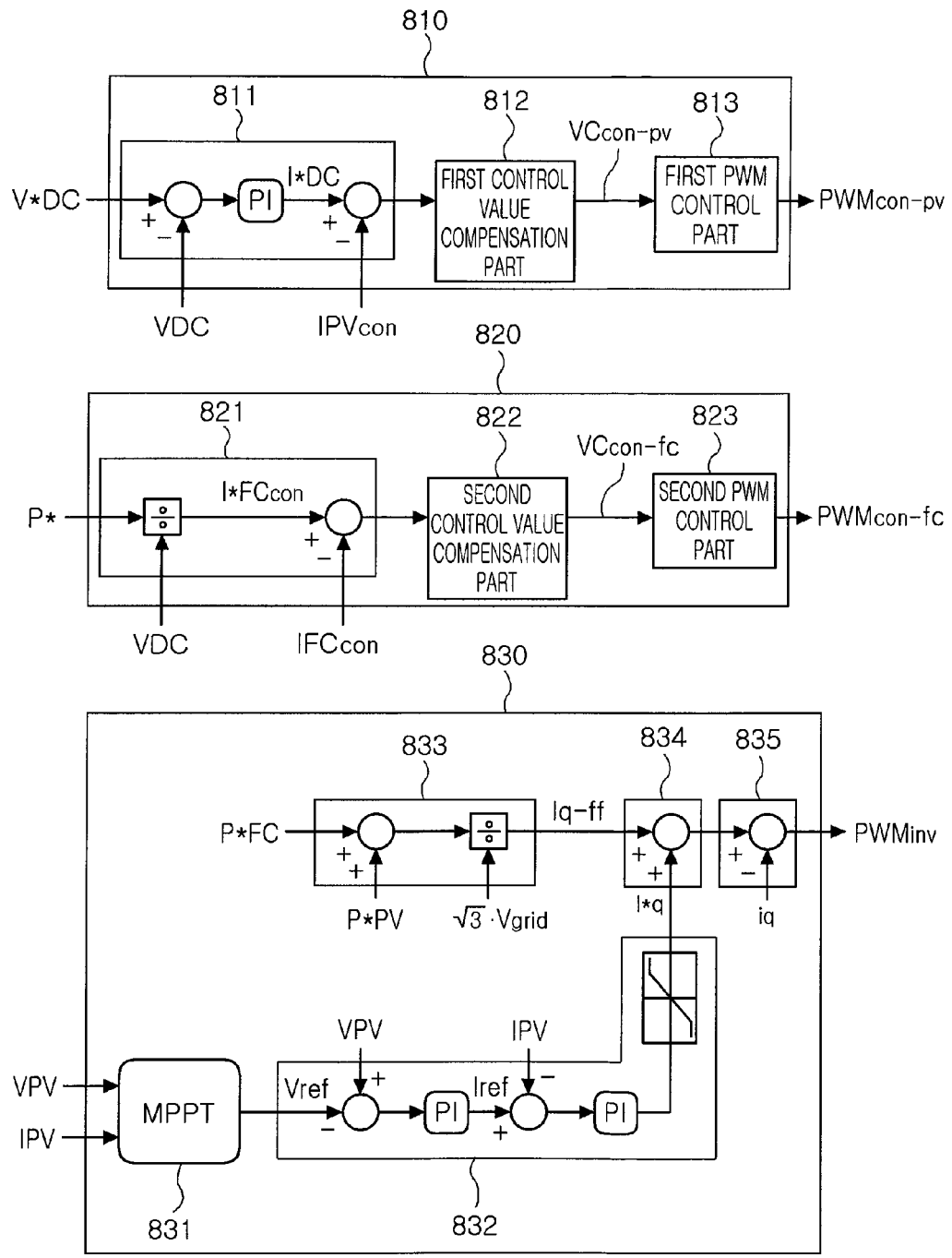
FIG. 4 is a conceptual view of a second grid-connected control mode when photovoltaic generation is being carried out during the grid-connected operation of a PV-FC hybrid generation system according to an exemplary embodiment of the present invention.

FIG. 4 is a conceptual diagram illustrating a second grid-connected control mode when photovoltaic generation is being carried out when the PV-FC hybrid generation system performs a grid-connected operation according to an exemplary embodiment of the invention.

Referring to FIG. 4, the PV converter controller 810 may include a first calculation part 811, a first control value compensation part 812, and a first PWM control part 813. In the second grid-connected control mode, the first calculation part 811 calculates a first control error value for constant voltage control on the PV DC/DC converter unit 210. The first control value compensation part 812 compensates a PV converter control value Vccon-pv, using the first control error value from the first calculation part 811. The first PWM control part 813 generates a PV PWM converter control signal PWMcon-pv, using the PV converter control value Vccon-pv compensated by the first control value compensation part 812, and controls the operation of the PV DC/DC converter unit 210, using the PV PWM converter control signal PWMcon-pv.

The first calculation part 811 of the PV converter controller 810, in the second grid-connected control mode, generates a DC command value I*DC by performing the PI control of a difference value between a predetermined DC voltage command value V*DC and the DC voltage VDC, and calculates the first control error value corresponding to a difference value between the DC command value I*DC and the output current IPVcon of the PV DC/DC converter unit 210.

Referring to FIG. 4, the FC converter controller 820 may include a second calculation part 821, a second control value compensation part 822, and a second PWM control part 823. In the second grid-connected control mode, the second calculation part 821 calculates a second control error value for constant current control on the FC DC/DC converter unit 220. The second control value compensation part 822 compensates an FC converter control value VCcon-fc, using the second control error value from the second calculation part 821. The second PWM control part 823 generates an FC PWM converter control signal PWMcon-fc, using the FC converter control value VCcon-fc compensated by the second control value compensation part 822, and controls the operation of the FC DC/DC converter unit 220, using the FC PWM converter control signal PWMcon-fc.

In the second grid-connected control mode, the second calculation part 821 of the FC converter controller 820 may generate an output current command value I*FCcon of an FC converter by dividing a predetermined power command value P* by the DC voltage VDC, and calculate the second control error value corresponding to a difference value between the output current command value I*FCcon of the FC converter and the output current IFCcon of the FC converter.

Referring to FIG. 4, the inverter controller 830 may include a maximum power point tracking part 831, a current command value calculation part 832, a current compensation value calculation part 833, a current compensation part 834, and a third PWM control part 835. In the second grid-connected control mode, the maximum power point tracking part 831 generates a reference voltage Vref by performing maximum power point tracking (MPPT) on the DC/AC inverter unit 400, using the output voltage VPV and the output current IPV from the photovoltaic cell 110. The current command value calculation part 832 generates a current command value I*q, using the reference voltage Vref from the maximum power point tracking part 831. The current compensation value calculation part 833 generates power by adding a predetermined FC power command value P*FC and a predetermined PV power command value P*PV, and generates a current compensation value Iq-ff by dividing the power by a voltage $\sqrt{3}\times$Vgrid set according to the grid voltage Vgrid. The current compensation part 834 compensates the current command value I*q, calculated by the current command value calculation part 832, using the current compensation value Iq-ff calculated by the current compensation value calculation part 833. The third PWM control part 835 generates a PWM inverter control signal PWM-inv by calculation using a detection current iq and the current command value calculated by the current compensation part 834, and controls the operation of the DC/AC inverter unit 400, using the PWM inverter control signal PWM-inv.

The current command value calculation part 832 of the inverter controller 830 may perform the PI control of a difference value between the PV output voltage VPV and the reference voltage Vref from the maximum power point tracking part 831 to thereby generate a reference current Iref, and perform the PI control of a difference value between the reference current Iref and the PV output current IPV to thereby generate the current command value I*q.

Figure 5:
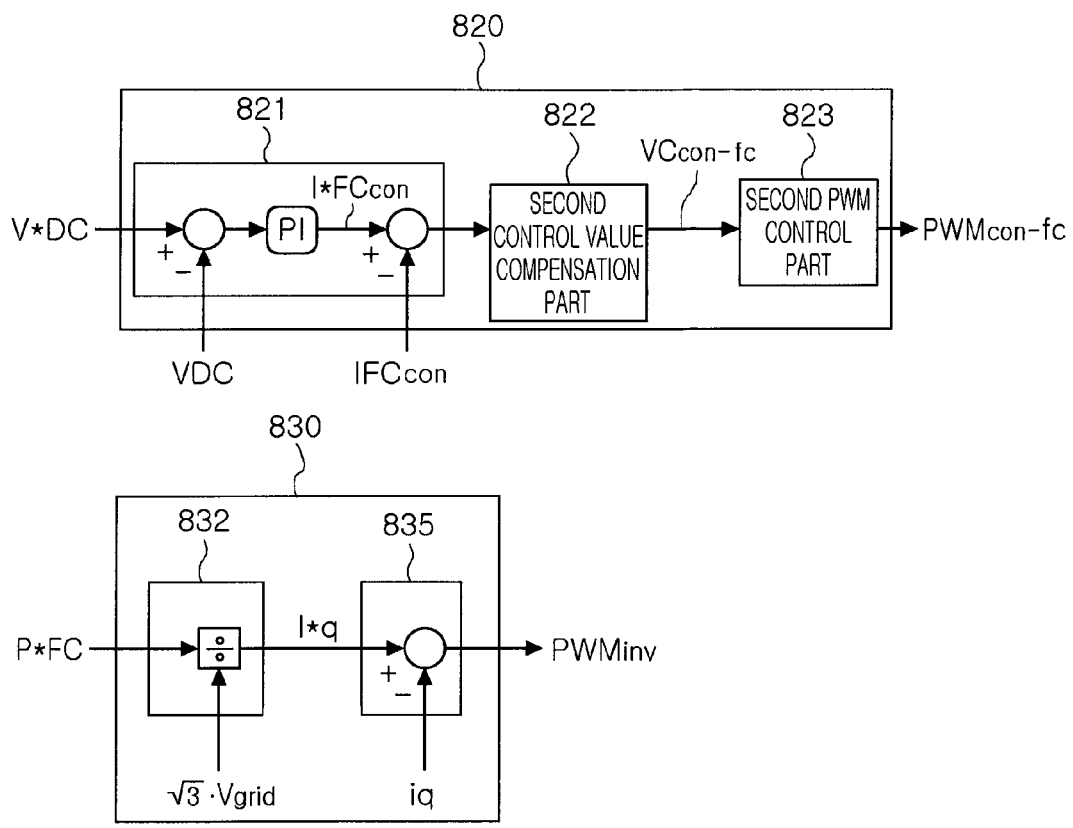
FIG. 5 is a conceptual view of a first grid-connected control mode when photovoltaic generation is not being carried out during the grid-connected operation of a PV-FC hybrid generation system according to an exemplary embodiment of the present invention.

FIG. 5 is a conceptual view illustrating a first grid-connected control mode when photovoltaic generation is not being carried out when a PV-FC hybrid generation system performs a grid-connected operation.

Referring to FIG. 5, the PV converter controller 810 may control the termination of the operation of the PV DC/DC converter unit 210 in the first grid-connected control mode.

Referring to FIG. 5, the FC converter controller 820 may include a second calculation part 821, a second control value compensation part 822, and a second PWM control part 823. In the first grid-connected control mode, the second calculation part 821 calculates a second control error value for constant voltage control on the FC DC/DC converter unit 220. The second control value compensation part 822 compensates an FC converter control value VCcon-fc using the second control error value from the second calculation part 821. The second PWM control part 823 generates an FC PWM converter control signal PWMcon-fc, using the FC converter control value VCcon-fc compensated by the second control value compensation part 822, and controls the operation of the FC DC/DC converter unit 220, using the FC PWM converter control signal PWMcon-fc.

In the first grid-connected control mode, the second calculation part 821 of the FC converter controller 820 may perform the PI control of a difference value between a predetermined DC voltage command value V*DC and the DC voltage VDC to generate an output current command value I*FCcon of the FC converter, and calculate the second control error value corresponding to a difference value between the output current command value I*FCcon of the FC converter and the output current IFCcon from the FC DC/DC converter unit 220.

Referring to FIG. 5, the inverter controller 830 may include a current command value calculation part 832 and a third PWM control part 835. In the first grid-connected control mode, the current command value calculation part 832 generates a current command value I*q by dividing a predetermined FC power command value P*FC by a voltage $\sqrt{3}\times$Vgrid set according to the grid voltage Vgrid for grid connection and output current control on the DC/AC inverter unit 400. The third PWM control part 835 generates a PWM inverter control signal PWM-inv by calculation using a detection current iq and the current command value I*q generated by the current command value calculation part 832, and controls the operation of the DC/AC inverter unit 400, using the PWM inverter control signal PWM-inv.

Figure 6:
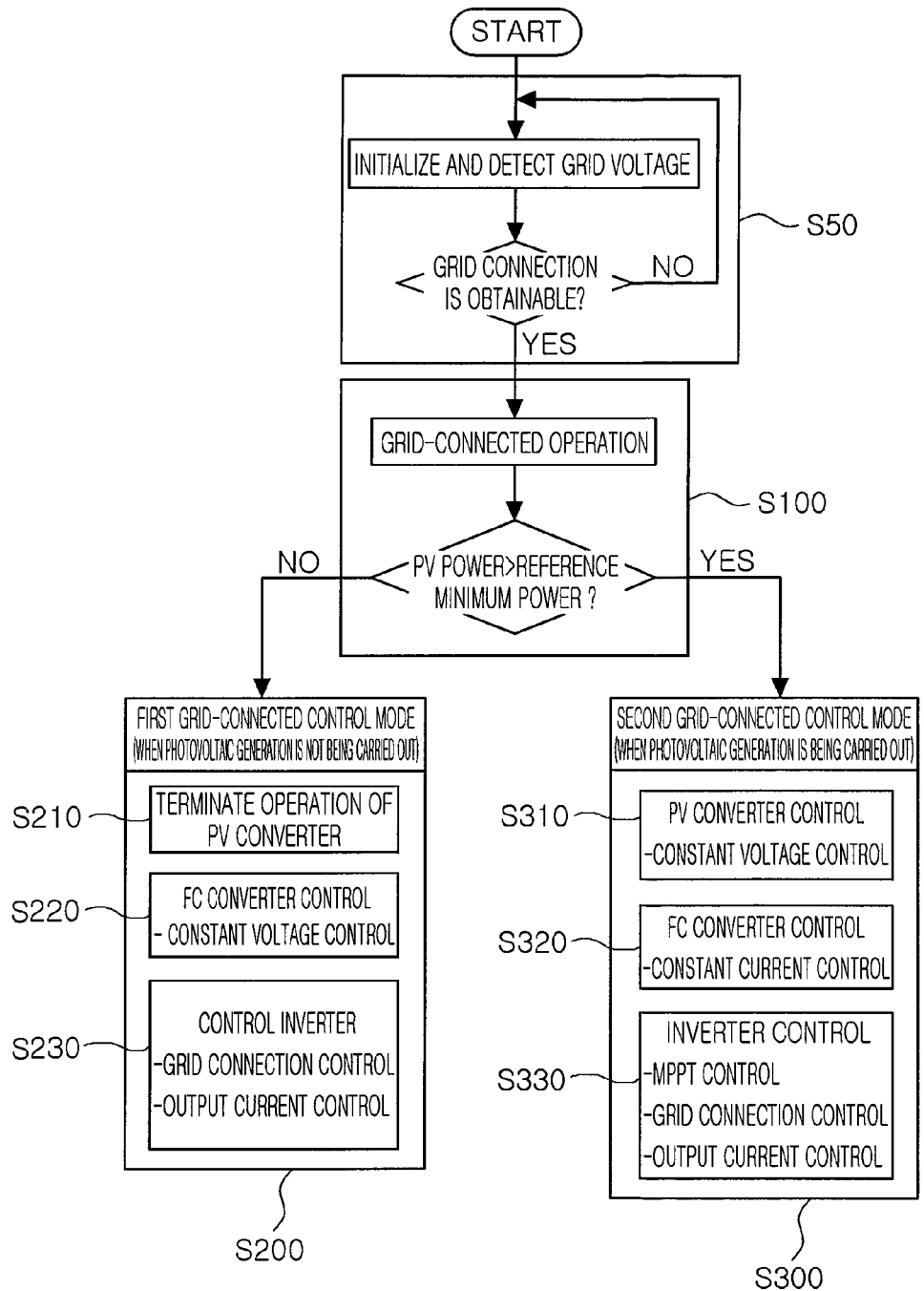
FIG. 6 is a flowchart illustrating a method of controlling a photovoltaic and fuel cell (PV-FC) hybrid generation system using dual converters and a single inverter according to an exemplary embodiment of the present invention.

FIG. 6 is a flowchart illustrating a method of controlling a PV-FC hybrid generation system using two converters and a single inverter according to another exemplary embodiment of the invention.

Referring to FIGS. 2, 3 and 6, the method of controlling a PV-FC hybrid generation system according to this embodiment can be applied to the PV-FC hybrid generation system that includes the PV DC/DC converter unit 210 converting a PV output voltage VPV from the photovoltaic cell (that is, a solar cell) 110 into a predetermined voltage, the FC DC/DC converter unit 220 converting an FC output voltage VFC from the fuel cell 120 into a predetermined voltage, the DC link unit 300 commonly connecting the output terminal of the PV DC/DC converter unit 210 and the output terminal of the FC DC/DC converter unit 220 and linking the PV output voltage VPV, converted by the PV DC/DC converter unit 210, to the FC output voltage VFC, converted by the FC DC/DC converter unit 220, to thereby generate a DC voltage VDC, and the DC/AC inverter unit 400 converting the DC voltage VDC from the DC link unit 300 into a predetermined AC voltage Vac.

The method of controlling a PV-FC hybrid generation system according to this embodiment includes a system start operation S50, a grid-connected photovoltaic generation determination operation S100, a first grid-connected control operation S200, and a second grid-connected control operation S300. In the system start operation S50, voltage and current are detected for grid-connected determination, and it is determined whether grid connection is obtainable on the basis of the detected voltage and current. In the grid-connected photovoltaic generation determination operation S100, a grid-connected operation mode is performed when it is determined that the grid connection is obtainable, and a photovoltaic generation status is determined by comparing a predetermined minimum PV power Pmin with the PV power PPV obtained by calculation using the PV output voltage VPV and the output current IPV from the photovoltaic cell 110. The first grid-connected control operation S200 includes a first converter control operation S210, a second converter control operation S220, and an inverter control operation S230. When it is determined that photovoltaic generation is not being carried out in the grid-connected operation mode in the grid-connected photovoltaic generation determination operation S100, the operation of PV DC/DC converter unit 210 is terminated in the first converter control operation S210, constant voltage control is provided for the FC DC/DC converter unit 220 in the second converter control operation S220, and grid connection and output current control on the DC/AC inverter unit 400 are performed in the inverter control operation S230. The second grid-connected control operation S300 includes a first converter control operation S310, a second converter control operation S320, and an inverter control operation S330. When photovoltaic generation is being carried out in the grid-connected operation mode in the grid-connected photovoltaic generation determination operation S100, constant voltage control on the PV DC/DC converter unit 210 is performed in the first converter control operation S310, constant current control on the FC DC/DC converter unit 220 is performed in the second converter control operation S320, and maximum power point tracking (MPPT) control, grid connection control, and output current control on the DC/AC inverter unit 400 are performed in the inverter control operation S330.

In each of the system start operation S50, the first grid-connected control operation S200, and the second grid-connected control operation S300, the FC output voltage VFC and the output current IFC may be detected from the fuel cell 120, the PV output voltage VPV and the output current IPV may be detected from the photovoltaic cell 110, the output currents IPVcon and IFCcon may be detected from the PV DC/DC converter unit 210 and the FC DC/DC converter unit 220, respectively, the DC voltage VDC may be detected from the DC link unit 300, the AC voltage Vac and an output current Iout may be detected from the DC/AC inverter unit 400, and the grid voltage Vgrid may be detected from the grid of the commercial power supply 600.

Figure 7:
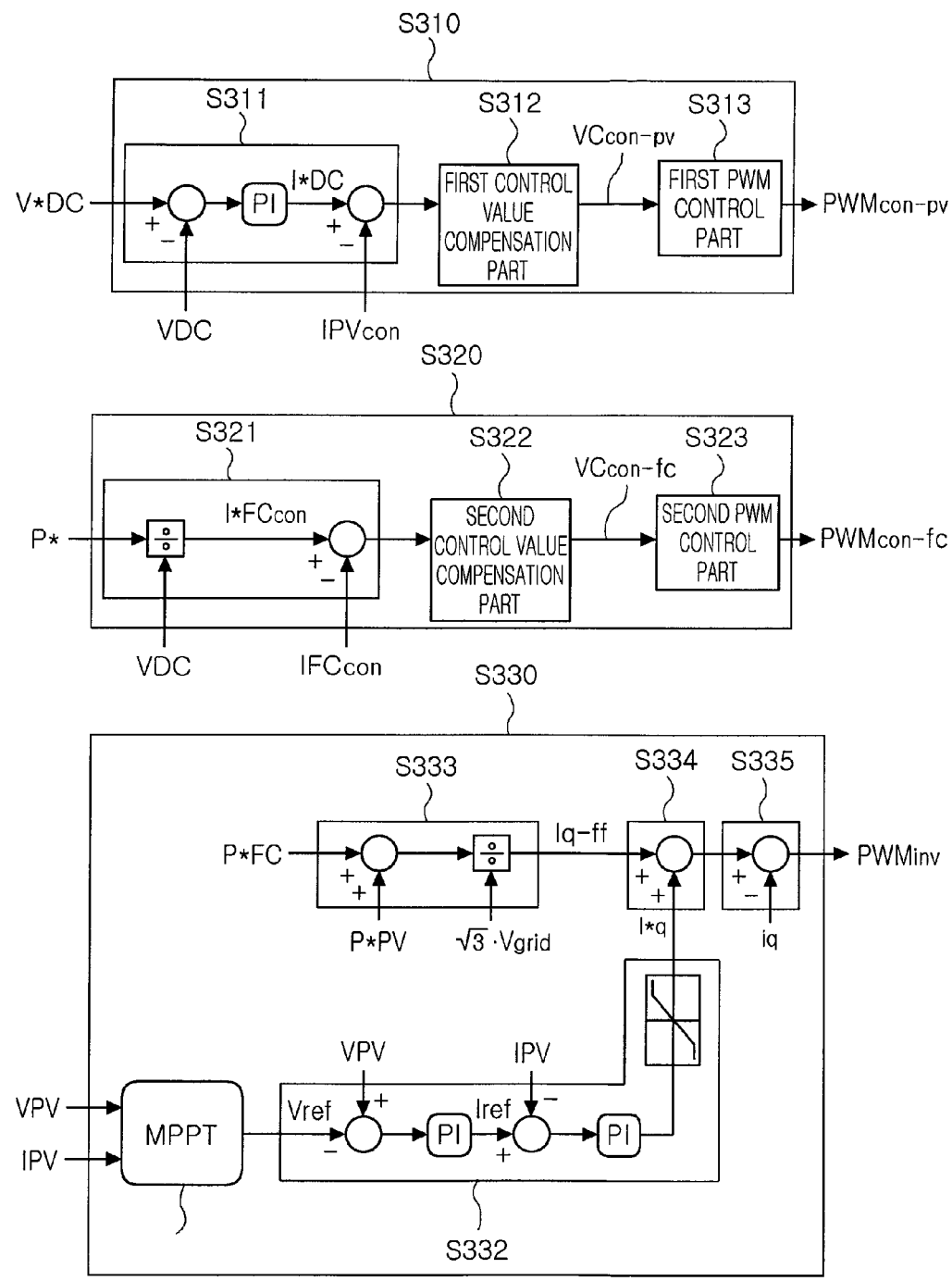
FIG. 7 is a control flow diagram illustrating a second grid-connected control mode when photovoltaic generation is being carried out during the grid-connected operation of a PV-FC hybrid generation system according to an exemplary embodiment of the present invention.

FIG. 7 is a control flow diagram illustrating a second grid-connected control mode when photovoltaic generation is being carried out during the grid-connected operation of a PV-FC hybrid generation system according to an exemplary embodiment of the invention.

Referring to FIGS. 6 and 7, the first converter control operation S310 of the second grid-connected control operation S300 may include a first calculation operation S311, a first control value compensation operation S312, and a first PWM control operation S313. In the first calculation operation S311, a first control error value is calculated for constant voltage control on the PV DC/DC converter unit 210. In the first control value compensation operation S312, a PV converter control value Vccon-pv is compensated using the first control error value calculated in the first calculation operation S311. In the first PWM control operation S313, a PV PWM converter control signal PWMcon-pv is generated using the PV converter control value Vccon-pv compensated in the first control value compensation operation S312, and the operation of the PV DC/DC converter unit 210 is controlled using the PV PWM converter control signal PWMcon-pv.

In the first calculation operation S311 of the first converter control operation S310, the PI control of a difference value between a predetermined DC voltage command value V*DC and the DC voltage VDC to generate the DC command value I*DC is performed, and the first control error value corresponding to a difference value between the DC command value I*DC and the output current IPVcon from the PV DC/DC converter unit 210.

Referring to FIGS. 6 and 7, the second converter control operation S320 of the second grid-connected control operation S300 may include a second calculation operation S321 in which a second control error value is calculated for constant current control on the FC DC/DC converter unit 220, a second control value correction operation S322 in which an FC converter control value VCcon-fc is compensated using the second control error value calculated in the second calculation operation S321, and a second PWM control operation S323 in which an FC PWM converter control signal PWMcon-fc is generated using the FC converter control value VCcon-fc compensated in the second control value correction operation S322, and the operation of the FC DC/DC converter unit 220 is controlled using the FC PWM converter control signal PWMcon-fc.

Here, in the second calculation operation S321 of the second grid-connected control operation S300, an output current command value I*FCcon of the FC converter is generated by dividing a predetermined power command value P* by the DC voltage VDC, and the second control error value corresponding to a difference value between the output current command value I*FCcon of the FC converter and an output current IFCcon from the FC converter.

Referring to FIGS. 6 and 7, the inverter control operation S330 of the second grid-connected control operation S300 may include a maximum power point tracking operation S331 in which maximum power point tracking (MPPT) on the DC/AC inverter unit 400 is performed using the output voltage VPV and the output current IPV from the photovoltaic cell 110 to generate a reference voltage Vref, a current command value calculation operation S332 in which a current command value I*q is generated using the reference voltage Vref generated in the maximum power point tracking operation S331, a current compensation value calculation operation S333 in which power is generated by adding the predetermined FC power command value P*FC and a predetermined PV power command value P*PV, and the generated power is divided by a voltage $\sqrt{3} \times$Vgrid set according to the grid voltage Vgrid to generate a current compensation value Iq-ff, a current compensation operation S334 in which the current command value I*q, calculated in the current command value calculation operation S332, is compensated using the current compensation value Iq-ff, calculated in the current compensation value calculation operation S333, and a third PWM control operation S335 in which a PWM inverter control signal PWM-inv is generated by calculation using a detection current iq and the current command value, compensated in the current compensation operation S334, and the operation of the DC/AC inverter unit 400 is controlled using the PWM inverter control signal PWM-inv.

In the current command value calculation operation S332 of the inverter control operation S330, the PI control of a difference value between the PV output voltage VPV and the reference voltage Vref of the maximum power point tracking part 831 is performed to generate a reference current Iref, and the PI control of a difference value between the reference current Iref and the PV output current IPV is performed to thereby generate the current command value I*q.

Figure 8:
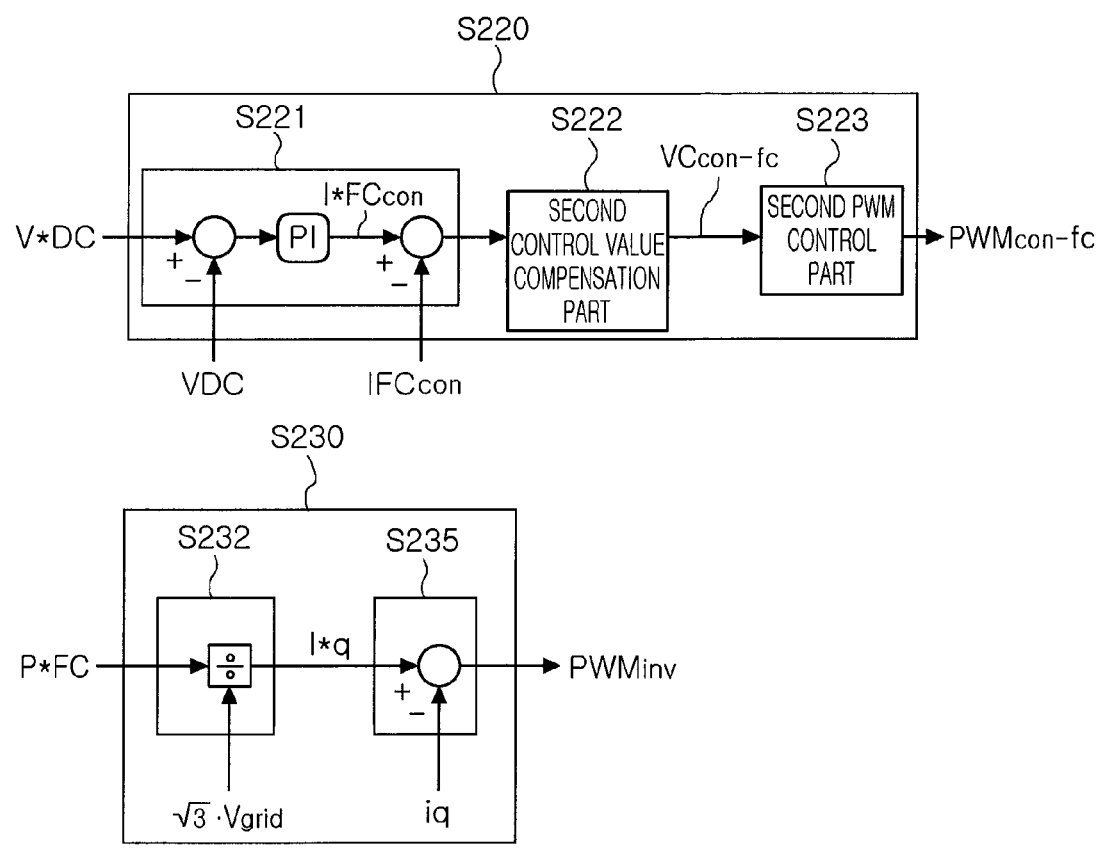
FIG. 8 is a control flow diagram illustrating a first grid-connected control mode when photovoltaic generation is not being carried out during the grid-connected operation of a PV-FC hybrid generation system according to an exemplary embodiment of the present invention.

FIG. 8 is a control flow diagram illustrating a first grid-connected control mode when photovoltaic generation is not being carried out during the operation of a PV-FC hybrid generation system according to an exemplary embodiment of the invention.

Referring to FIGS. 6 and 8, the second converter control operation S220 of the first grid-connected control operation S200 includes a second calculation operation S221 in which a second control error value is calculated for constant voltage control on the FC DC/DC converter unit 220, a second control value compensation S222 in which an FC converter control value VCcon-fc is compensated using the second control error value calculated in the second calculation operation S221, and a second PWM control operation S223 in which an FC PWM converter control signal PWMcon-fc is generated using the FC converter control value VCcon-fc compensated in the second control value compensation S222, and the operation of the FC DC/DC converter unit 220 is controlled using the FC PWM converter control signal PWMcon-fc.

In the second calculation operation S221 of the second converter control operation S220, the PI control of a difference between a predetermined DC voltage command value V*DC and the DC voltage VDC may be performed to generate an output current command value I*FCcon of the FC converter, and the second control error value corresponding to a difference value between the output current command value I*FCcon from the FC converter and the output current IFCcon from the FC DC/DC converter 220 may be calculated.

Referring to FIGS. 6 and 8, the inverter control operation S230 of the first grid-connected control operation S200 may include a current command value calculation operation S232 in which a current command value I*q is calculated by dividing a predetermined FC power command value P*FC by a voltage $\sqrt{3} \times \text{Vgrid}$ set according to the grid voltage Vgrid in order to perform grid connection and output current control on the DC/AC inverter unit 400, and a third PWM control operation S235 in which a PWM inverter control signal PWM-inv is generated by calculation using a detection current iq and the current command value I*q, calculated in the current command value calculation operation S232, and the operation of the DC/AC inverter unit 400 is controlled using the PWM inverter control signal PWM-inv.

Hereinafter, the operation and effects of the invention will be described in detail with reference to the accompanying drawings.

The PV-FC hybrid generation system according to the exemplary embodiment of the invention will be described with reference to FIGS. 1 and 2.

In the PV-FC hybrid generation systems according to the embodiments, shown in FIGS. 1 and 2, the PV DC/DC converter unit 210 converts a PV output voltage VPV from the photovoltaic cell 110, which converts the energy of sunlight into electrical energy, into a predetermined voltage, and outputs the predetermined voltage to the DC link unit 300.

Here, the photovoltaic cell 110 may include a plurality of photovoltaic cells connected in series to thereby generate voltage required for the PV DC/DC converter unit 210 when the sun shines. In order to generate the maximum power using the photovoltaic cell 110, maximum power point tracking (MPPT) needs to be performed in order to track the maximum power point of the power generated by the photovoltaic cell 110. The PV DC/DC converter unit 210 converts the PV output voltage VPV to the range from 350V to 380V, which is required for DC/AC conversion.

The FC DC/DC converter unit 220 converts the FC output voltage VFC from the fuel cell 120, which converts chemical energy into electrical energy, into a predetermined voltage, and outputs the predetermined voltage to the DC link unit 300.

Here, the fuel cell 120 may output an FC output voltage of approximately 24V to 42V and an FC output current IFC of up to 50 A. The FC DC/DC converter unit 220 converts the FC output voltage VFC to the range of approximately 350V to 380V, which is required for DC/AC conversion.

Then, the DC link unit 300 commonly connects the output terminal of the PV DC/DC converter unit 210 and the output terminal of the FC DC/DC converter unit 220, links the PV output voltage VPV converted by the PV DC/DC converter unit 210 to the FC output voltage VFC converted by the FC DC/DC converter unit 220 to generate a DC voltage VDC, and outputs the DC voltage VDC to the DC/AC inverter unit 400.

The DC/AC inverter unit 400 converts the DC voltage VDC from the DC link unit 300 into a predetermined AC voltage Vac.

In the PV-FC hybrid generation system according to the embodiment, shown in FIG. 2, the voltage/current detection unit 700 detects voltages and currents, generated by the fuel cell 120, the photovoltaic cell 110 and the DC/AC inverter unit 400, and the output currents IPVcon and IFCcon from the PV DC/DC converter unit 210 and the FC DC/DC converter unit 220, respectively, and supplies the detected voltages and currents to the hybrid generation control unit 800.

The hybrid generation control unit 800 may control the operations of the PV DC/DC converter unit 210, the FC DC/DC converter unit 220, and the DC/AC inverter unit 400 in a first or second grid-connected control mode, selected according to whether photovoltaic generation is being carried out or not, on the basis of the plurality of voltages and currents detected by the voltage/current detection unit 700.

In the embodiments, shown in FIGS. 1 and 2, the DC link unit 300 may include the capacitor Cdc. Here, noise or AC ripple, which may be included in the DC voltage VDC, can be cancelled by the capacitor Cdc, so that the DC link unit 300 can supply a more stable DC voltage VDC.

When the DC/AC inverter unit 400 includes the DC/AC inverter 410, the filter 420, and the grid transmitter 430, the DC/AC inverter 410 converts the DC voltage VDC from the DC link unit 300 into a pulsed voltage, and outputs the pulsed voltage to the filter 420. The filter 420 may convert the pulsed voltage from the DC/AC inverter 410 into the AC voltage Vac. The grid transmitter 430 may transmit the AC voltage Vac from the filter 420 to the grid.

The voltage/current detection unit 700 according to the embodiment, shown in FIG. 2, may detect the FC output voltage VFC and the output current IFC from the fuel cell 120, the PV output voltage VPV and the output current IPV from the photovoltaic cell 110, the output currents IPVcon and IFCcon from the PV DC/DC converter unit 210 and the FC DC/DC converter unit 220, respectively, the DC voltage VDC from the DC link unit 300, the AC voltage Vac and the output current Iout from the DC/AC inverter unit 400, and the grid voltage Vgrid from the grid of the commercial power supply 600.

When the hybrid generation control unit 800 includes the PV converter controller 810, the FC converter controller 820, and the inverter controller 830, the PV converter controller 810 controls the operation of the PV DC/DC converter unit 210, using the DC voltage VDC and the output current IPVcon from the PV DC/DC converter unit 210. The FC converter controller 820 controls the operation of the FC DC/DC converter unit 220, using the DC voltage VDC and the output current IFCcon from the FC DC/DC converter unit 220. The inverter controller 830 controls the operation of the DC/AC inverter unit 400 on the basis of the PV output voltage VPV and the output current IPV detected by the voltage/current detection unit 700.

Referring to FIGS. 2 and 3, after a grid-connected operation starts, the hybrid generation control unit 800 or each of the PV converter controller 810, the FC converter controller 820, and the inverter controller 830 may determine a photovoltaic generation status on the basis of the PV power PPV obtained by calculation using the PV output voltage VPV and the output current IPV from the photovoltaic cell 110, and perform one of the predetermined first and second grid-connected control modes, which is selected according to the determined photovoltaic generation status. Here, as for a grid-connected operation mode, the first grid-connected control mode is performed when photovoltaic generation is being carried out and the second grid-connected control mode is performed when photovoltaic generation is being carried out.

Hereinafter, in a PV-FC hybrid generation system according to an exemplary embodiment of the invention, a first grid-connected control mode when photovoltaic generation is not being carried out and a second grid-connected control mode when photovoltaic generation is being carried out during a grid-connected operation will be described with reference to FIGS. 4 and 5.

First, the second grid-connected control mode of the PV-FC hybrid generation system according to the exemplary embodiment of the invention will be described with reference to FIG. 4.

The PV converter controller 810 may include the first calculation part 811, the first control value compensation part 812, and the first PWM control part 813. The FC converter controller 820 may include the second calculation part 821, the second control value compensation part 822, and the second PWM control part 823. The inverter controller 830 may include the current command value calculation part 832 and the third PWM control part 835.

The first calculation part 811 of the PV converter controller 810 calculates a first control error value for constant voltage control on the PV DC/DC converter unit 210, and supplies the first control error value to the first control value compensation part 812. The first control value compensation part 812 compensates a PV converter control value Vccon-pv, using the first control error value from the first calculation part 811, and supplies the compensated PV converter control value Vccon-pv to the first PWM control part 813. The first PWM control part 813 generates the PV PWM converter control signal PWMcon-pv, using the PV converter control value Vccon-pv, compensated by the first control value compensation part 812, and controls the operation of the PV DC/DC converter unit 210, using the PV PWM converter control signal PWMcon-pv.

Here, in the second grid-connected control mode, the first calculation part 811 of the PV converter controller 810 performs the PI control of a difference value between a predetermined DC voltage command value V*DC and the DC voltage to thereby generate a DC command value I*DC, and calculates the first control error value corresponding to a difference value between the DC command value I*DC and the output current IPVcon from the PV DC/DC converter unit 210.

In the second grid-connected control mode, the second calculation part 821 of the FC converter controller 820 calculates a second control error value for constant voltage control on the FC DC/DC converter unit 220, and supplies the second control error value to the second control value compensation part 822. The second control value compensation part 822 compensates an FC converter control value VCcon-fc, using the second control error value from the second calculation part 821, and supplies the compensated FC converter control value VCcon-fc to the second PWM control part 823. The second PWM control part 823 generates an FC PWM converter control signal PWMcon-fc, using the FC converter control value VCcon-fc, compensated by the second control value compensation part 822, and controls the operation of the FC DC/DC converter unit 220 using the FC PWM converter control signal PWMcon-fc.

Here, in the second grid-connected control mode, the second calculation part 821 of the FC converter controller 820 may generate an output current command value I*FCcon from an FC converter by dividing a predetermined power command value P* by the DC voltage VDC, and calculate the second control error value corresponding to a difference value between the output current command value I*FCcon of the FC converter and the output current IFCcon from the FC converter.

In the second grid-connected control mode, the maximum power point tracking part 831 of the inverter controller 830 generates a reference voltage Vref by performing maximum power point tracking (MPPT) on the DC/AC inverter unit 400, using the output voltage VPV and the output current IPV from the photovoltaic cell 110, and supplies the reference voltage Vref to the current command value calculation part 832. The current command value calculation part 832 generates a current command value I*q, using the reference voltage Vref from the maximum power point tracking part 831, and supplies the current command value I*q to the current compensation value calculation part 833. The current compensation value calculation part 833 generates power by adding a predetermined FC power command value P*FC and a predetermined PV power command value P*PV, and generates a current compensation value Iq-ff by dividing the power by a voltage $\sqrt{3} \times$Vgrid set according to the grid voltage Vgrid, and supplies the current compensation value Iq-ff to the current compensation part 834.

The current compensation part 834 compensates the current command value I*q, calculated by the current command value calculation part 832, using the current compensation value Iq-ff calculated by the current compensation value calculation part 832, and supplies the compensated current command value I*q to the third PWM control part 835. The third PWM control part 835 generates a PWM inverter control signal PWM-inv by calculation using a detection current iq and the current command value calculated by the current compensation part 834, and controls the operation of the DC/AC inverter unit 400, using the PWM inverter control signal PWM-inv.

Here, in the current command value calculation operation S332 of the inverter control operation S330, the PI control of a difference value between the PV output voltage VPV and the reference voltage Vref of the maximum power point tracking part 831 is performed to generate a reference current Iref, and the PI control of a difference value between the reference current Iref and the PV output current IPV is performed to thereby generate the current command value I*q.

Meanwhile, the maximum power point tracking (MPPT) refers to the control that tracks the maximum power point in order to generate the maximum power by varying one among resistance, voltage and current associated with power since the photovoltaic cell has the maximum power point when the PV power is greater than a predetermined reference power.

The first grid-connected control mode of the PV-FC hybrid generation system according to the exemplary embodiment of the invention will be described with reference to FIG. 5.

Referring to FIG. 5, in the first grid-connected control mode, the PV converter controller 810 does not perform a control operation. The FC converter controller 820 may include the second calculation part 821, the second control value compensation part 822, and the second PWM control part 823. The inverter controller 830 may include the maximum power point tracking part 831, the current command value calculation part 832, the current compensation value calculation part 833, the current compensation part 834, and the third PWM control part 835.

Referring to FIG. 5, the second calculation part 821 of the FC converter controller 820 calculates a second control error value for constant voltage control on the FC DC/DC converter unit 220, and outputs the second control error value to the second control value compensation part 822. The second control value compensation part 822 compensates an FC converter control value VCcon-fc, using the second control error value from the second calculation part 821, and outputs the converter control value VCcon-fc to the second PWM control part 823. The second PWM control part 823 may generate an FC PWM converter control signal PWMcon-fc, using the FC converter control value VCcon-fc compensated by the second control value compensation part 822, and control the operation of the FC DC/DC converter unit 220, using the FC PWM converter control signal PWMcon-fc.

Here, in the first grid-connected control mode, the second calculation part 821 of the FC converter controller 820 may generate an output current command value I*FCcon of the FC converter by dividing a predetermined power command value P* by the DC voltage VDC, and calculate the second control error value corresponding to a difference value between the output current command value I*FCcon of the FC converter and the output current IFCcon of the FC converter.

Here, the second control value compensation part 822 may include a proportional-integral (PI) controller that removes an error component from the converter control value VCcon-fc, using the second control error value from the second calculation part 821.

The second PWM control part 823 compares the FC converter control value VCcon-fc, compensated by the second control value compensation part 822, with a reference signal having a predetermined triangular waveform, outputs a high level when the converter control value VCcon-fc is greater than the reference signal, and a low level when the converter control value VCcon-fc is not greater than the reference signal. That is, the second PWM control part 823 generates an FC PWM converter control signal PWMcon-fc having a pulse width varying according to the magnitude level of the converter control value VCcon-fc.

Referring to FIG. 5, in the first grid-connected control mode, the current command value calculation part 832 of the inverter controller 830 generates a current command value I*q by dividing a predetermined FC power command value P*FC by a voltage $\sqrt{3}\times$Vgrid set according to the grid voltage Vgrid for grid connection and output current control on the DC/AC inverter unit 400, and supplies the current command value I*q to the third PWM control part 835.

The third PWM control part 835 generates a PWM inverter control signal PWM-inv by calculation using a detection current iq and the current command value calculated by the current compensation part 834, and controls the operation of the DC/AC inverter unit 400, using the PWM inverter control signal PWM-inv.

Here, when the grid connection is achieved, the AC voltage Vac from the filter 420 is transmitted to the grid through the grid transmitter 430 of the DC/AC inverter unit 400 by synchronizing a phase of the AC voltage Vac from the filter 420 with a phase of the grid voltage.

Hereinafter, a method of controlling a PV-FC hybrid generation system according to an exemplary embodiment of the invention will be described with reference to FIGS. 2 and 3 and FIGS. 6 through 8.

Referring to FIGS. 2 and 3 and FIGS. 6 through 8, a method of controlling a PV-FC hybrid generation system according to this embodiment can be applied to the PV-FC hybrid generation system that includes a PV DC/DC converter unit 210 converting a PV output voltage VPV from the photovoltaic cell (that is, a solar cell) 110 into a predetermined voltage, the FC DC/DC converter unit 220 converting an FC output voltage VFC from the fuel cell 120 into a predetermined voltage, the DC link unit 300 commonly connecting the output terminal of the PV DC/DC converter unit 210 and the output terminal of the FC DC/DC converter unit 220 and linking the PV output voltage VPV, converted by the PV DC/DC converter unit 210, to the FC output voltage VFC, converted by the FC DC/DC converter unit 220, to thereby generate a DC voltage VDC, and the DC/AC inverter unit 400 converting the DC voltage VDC from the DC link unit 300 into a predetermined AC voltage Vac.

First, in the method of controlling a PV-FC hybrid generation system according to the embodiment, shown in FIG. 6, voltage and current necessary for the determination of grid-connection are detected, and it is determined whether grid connection is obtainable or not on the basis of the detected voltage in a system start operation S50.

When it is determined that the grid connection is obtainable, a grid-connected operation mode is performed, and a predetermined minimum PV power Pmin is compared with the PV power PPV obtained by calculation using the PV output voltage VPV and the output current IPV from the photovoltaic cell 110 to determine a photovoltaic generation status. For example, when the PV power PPV is greater than the minimum PV power Pmin, it may be determined that effective photovoltaic generation is being carried out. On the other hand, when the PV power PPV is not greater than the minimum PV power Pmin, it may be determined that effective photovoltaic generation is not being carried out.

When photovoltaic generation is not being carried out in the grid-connected operation mode in the grid-connected photovoltaic generation determination operation S100, the first converter control operation S210, the second converter control operation S220, and the inverter control operation S230 are performed in the first grid-connected control operation S200.

Here, in the first converter control operation S210, the operation of the PV DC/DC converter unit 210 is terminated. In the second converter control operation S220, constant voltage control on the FC DC/DC converter unit 220 is performed. In the inverter control operation S230, grid connection and output current control on the DC/AC inverter unit 400 are performed.

In the second grid-connected control operation S300, the first converter control operation S310, the second converter control operation S320, and the inverter control operation S330 are performed when photovoltaic generation is being carried out in the grid-connected operation mode in the grid-connected photovoltaic generation determination operation S100.

Here, in the first converter control operation S310, constant voltage control on the PV DC/DC converter unit 210 is performed. In the second converter control operation S320, constant current control on the FC DC/DC converter unit 220 is performed. In the inverter control operation S330, maximum power point tracking (MPPT) control, grid connection control and output current control on the DC/AC inverter unit 400 are performed.

In this embodiment, in each of the system start operation S50, the first grid-connected control operation S200, and the second grid-connected control operation S300, the FC output voltage VFC and the output current IFC may be detected from the fuel cell 120, the PV output voltage VPV and the output current IPV may be detected from the photovoltaic cell 110, the output currents IPVcon and IFCcon may be detected from the PV DC/DC converter unit 210 and the FC DC/DC converter unit 220, respectively, the DC voltage VDC may be detected from the DC link unit 300, the AC voltage Vac and an output current Iout may be detected from the DC/AC inverter unit 400, and the grid voltage Vgrid may be detected from the grid of the commercial power supply 600.

Hereinafter, a method of controlling a PV-FC hybrid generation system according to an exemplary embodiment of the invention performs a first grid-connected control operation S400 when photovoltaic generation is not being carried out and a second grid-connected control operation S300 when photovoltaic generation is being carried out during a grid-connected operation.

In the method of controlling a PV-FC hybrid generation system according to this embodiment, the second grid-connected control operation S300 will now be described with reference to FIG. 7.

Referring to FIG. 7, in the first calculation operation S311 of the first converter control operation S310 of the second grid-connected control operation S300, a first control error value is calculated for constant voltage control on the PV DC/DC converter unit 210, and is then supplied to the first control value compensation operation S312. In the first control value compensation operation S312, a PV converter control value Vccon-pv is compensated using the first control error value calculated in the first calculation operation S311, and is then supplied to the first PWM control operation S313. In the first PWM control operation S313, a PV PWM converter control signal PWMcon-pv is generated using the PV converter control value Vccon-pv compensated in the first control value compensation operation S312, and the operation of the PV DC/DC converter unit 210 is controlled using the PV PWM converter control signal PWMcon-pv.

Here, in the first calculation operation S311 of the first converter control operation S310, the PI control of a difference value between a predetermined DC voltage command value V*DC and the DC voltage VDC is performed to generate a DC command value I*DC, and the first control error value corresponding to a difference value between the DC command value I*DC and the output current IPVcon from the PV DC/DC converter unit 210 is calculated.

Furthermore, referring to FIG. 7, in the second calculation operation S321 of the second converter control operation S320 of the second grid-connected control operation S300, a second control error value is calculated for constant current control for the FC DC/DC converter unit 220 and is then supplied to the second control value correction operation S322. In the second control value correction operation S322, an FC converter control value VCcon-fc is compensated using the second control error value calculated in the second calculation operation S321, and is then supplied to the second PWM control operation S323. In the second PWM control operation S323, an FC PWM converter control signal PWMcon-fc is generated using the FC converter control value VCcon-fc compensated in the second control value correction operation S322, and the operation of the FC DC/DC converter unit 220 is controlled using the FC PWM converter control signal PWMcon-fc.

Here, in the second calculation operation S321 of the second converter control operation S320, an output current command value I*FCcon of the FC converter is generated by dividing a predetermined power command value P* by the DC voltage VDC, and the second control error value corresponding to a difference value between the output current command value I*FCcon from the FC converter and the output current IFCcon from the FC converter.

Furthermore, referring to FIG. 7, in the maximum power point tracking operation S331 the inverter control operation S330 of the second grid-connected control operation S300, maximum power point tracking (MPPT) on the DC/AC inverter unit 400 is performed using the output voltage VPV and the output current IPV from the photovoltaic cell 110 to generate a reference voltage Vref and supply the reference voltage Vref to the current command value calculation operation S332.

In the current command value calculation operation S332, a current command value I*q is generated using the reference voltage Vref generated in the maximum power point tracking operation S331, and is then supplied to the current compensation value calculation operation S333. In the current compensation value calculation operation S333, a predetermined FC power command value P*FC and a predetermined PV power command value P*PV are added to generate power, the power is divided by a v voltage $\sqrt{3} \times V_{grid}$ set according to the grid voltage Vgrid to generate a current compensation value Iq-ff, and the current compensation value Iq-ff is supplied to the current compensation operation S334.

In the current compensation operation S334, the current command value I*q calculated in the current command value calculation operation S332 is compensated using the current compensation value Iq-ff calculated in the current compensation value calculation operation S333, and the compensated current command value I*q is supplied to the third PWM control operation S335. In the third PWM control operation S335, a PWM inverter control signal PWM-inv is generated by calculation using a detection current iq and the current command value compensated in the current compensation operation S334, and the operation of the DC/AC inverter unit 400 is controlled using the PWM inverter control signal PWM-inv.

Here, in the current command value calculation operation S332 of the inverter control operation S330, the PI control of a difference value between the PV output voltage VPV and the reference voltage Vref of the maximum power point tracking part 831 is controlled to generate a reference current Iref, and the PI control of a difference value between the reference current Iref and the PV output current IPV is performed to generate the current command value I*q.

Then, the first grid-connected control operation S200 according to the method of controlling a PV-FC hybrid generation system will be described with reference to FIG. 8.

Referring to FIG. 8, in the second calculation operation S221 of the second converter control operation S220 of the first grid-connected control operation S200, a second control error value is calculated for constant current control on the FC DC/DC converter unit 220, and is then supplied to the second control value compensation S222. In the second control value compensation S222, the FC converter control value VCcon-fc is compensated using the second control error value calculated in the second calculation operation S221, and is then supplied to the second PWM control operation S223. In the second PWM control operation S223, an FC PWM converter control signal PWMcon-fc is generated using the FC converter control value VCcon-fc compensated in the second control value compensation S222, and the operation of the FC DC/DC converter unit 220 is controlled using the FC PWM converter control signal.

Here, in the second calculation operation S221 of the second converter control operation S220, the PI control of a difference between a predetermined DC voltage command value V*DC and the DC voltage VDC is performed to generate an output current command value I*FCcon of the FC converter, and the second control error value corresponding to a difference value between the output current command value I*FCcon of the FC converter and the output current IFCcon from the FC DC/DC converter 220 is calculated.

Referring to FIG. 8, in the current command value calculation operation S232 of the inverter control operation S230 of the first grid-connected control operation S200, a current command value I*q is generated by dividing a predetermined FC power command value P*FC by a voltage $\sqrt{3} \times$Vgrid set according to the grid voltage Vgrid for grid connection and output current control on the DC/AC inverter unit 400.

In the current command value calculation operation S232, a PWM inverter control signal PWM-inv is generated by calculation using the detection current iq and the current command value I*q, calculated in current command value calculation operation S232, and the operation of the DC/AC inverter unit 400 is controlled using the PWM inverter control signal PWM-inv.

In the above-described PV-FC hybrid generation system according to the exemplary embodiment of the invention, algorithms are applied in terms of power control so that the fuel cell generates power with rated capacity at all times, while the photovoltaic cell outputs the maximum power when photovoltaic generation is obtainable to thereby support the fuel cell, which enables independent control of output power from the two independent power sources. Furthermore, in order to supply constant output to the load, control may be performed so that the photovoltaic (PV) cell generates the maximum power while the fuel cell (FC) generates power corresponding to the difference between a predetermined power and a PV power generated by the photovoltaic cell.

In addition, the DC/DC converter unit may generate an output voltage according to a voltage command value obtained by adding a fluctuation of output voltage of the photovoltaic cell and a fluctuation of voltage caused by the MPPT control of the DC/AC inverter unit. The DC/AC inverter unit may operate by applying inversion and MPPT, used to output maximum power of the photovoltaic cell, grid connection, and output current control algorithms.

When the power, output from the photovoltaic cell, becomes less than the minimum power value due to the sunset or other environmental factors, an MPPT mode is terminated. After sunset, the DC/DC converter unit may be controlled so as to continuously follow command power in response to a power command, and the DC/AC inverter unit can perform grid connection and output current control operations.

The PV-FC hybrid generation system and the method of controlling the same, according to the exemplary embodiments of the invention, operates two energy sources including a combination of a photovoltaic cell and a fuel cell. As this hybrid generation system operates using a PV DC/DC converter unit, an FC DC/DC converter unit, and a single DC/AC inverter unit, the PV-FC hybrid generation system can perform voltage, current and power control for hybrid generation using a single hybrid generation controller, thereby reducing manufacturing costs, and system loss and volume.

The PV-FC hybrid generation system according to the exemplary embodiments of the invention has superior system efficiency due to a reduction in system hardware as compared with systems in the related art that use two FC DC/DC converter units and two DC/AC inverter units. Furthermore, a reduction in system size leads to a reduction in manufacturing costs, thereby ensuring low-cost implementation and price competitiveness. Also, the realization of practical PV-FC hybrid generation systems performing power generation using ultimate eco-friendly infinite energy sources helps gain a competitive edge in the market.

As set forth above, according to exemplary embodiments of the invention, the PV-FC hybrid generation system using the photovoltaic cell and the fuel cell by dual converters and a single inverter reduces the number of expensive inverters, thereby reducing system size and manufacturing costs.

Furthermore, the PV-FC hybrid generation system performs predetermined control modes according to whether power generation is being carried out or not during the grid-connection operation, thereby providing the power control of the hybrid generation system based on the environmental conditions.

While the present invention has been shown and described in connection with the exemplary embodiments, it will be apparent to those skilled in the art that modifications and variations can be made without departing from the spirit and scope of the invention as defined by the appended claims.

What is claimed is:

1. A PV-FC hybrid generation system, comprising:
   a PV DC/DC converter unit for converting a PV output voltage from a photovoltaic cell into a predetermined voltage;
   an FC DC/DC converter unit for converting an FC output voltage from a fuel cell into a predetermined voltage;
   a DC link unit commonly connecting an output terminal of the PV DC/DC converter unit and an output terminal of the FC DC/DC converter unit, and linking the converted PV output voltage from the PV DC/DC converter unit to the converted FC output voltage from the FC DC/DC converter unit to thereby generate a DC voltage;
   a DC/AC inverter unit for converting the DC voltage from the DC link unit into a predetermined AC voltage;
   a voltage/current detection unit for detecting a plurality of voltages and currents generated by the fuel cell, the photovoltaic cell, and the DC/AC inverter unit, and for detecting output voltages from the PV DC/DC converter unit and the FC DC/DC converter unit; and a hybrid generation control unit for controlling operations of the PV DC/DC converter unit, the FC DC/DC converter unit, and the DC/AC inverter unit on the basis of the plurality of voltages and currents detected by the voltage/current detection unit, wherein the voltage/current detection unit comprises the FC output voltage and output current from the fuel cell, the PV output voltage and output current from the photovoltaic cell, output currents from the PV DC/DC converter unit and the FC DC/DC converter unit, the DC voltage from the DC link unit, the AC voltage and output current from the DC/AC inverter unit, and a grid voltage from a grid of a commercial power supply, the hybrid generation control unit comprises:
- a PV converter controller for controlling the operation of the PV DC/DC converter unit, using the DC voltage and the output current from the PV DC/DC converter unit;
- an FC converter controller for controlling the operation of the FC DC/DC converter unit, using the DC voltage and the output current from the FC DC/DC converter unit; and
- an inverter controller for controlling the operation of the DC/AC inverter unit on the basis of the PV output voltage and the output current from the voltage/current detection unit, the PV converter controller, the FC converter controller, and the inverter controller each adapted to determine a photovoltaic generation status according to a PV power obtained by calculation using the PV output voltage and the output current from the photovoltaic cell after a grid-connected operation starts, and perform one of predetermined first and second grid-connected control modes according to the determined photovoltaic generation status, the first grid-connected control mode is a control mode when photovoltaic generation is not being carried out in a grid-connected operation mode, and the second grid-connected control mode is a control mode when photovoltaic generation is being carried out in the grid-connected operation mode, and the inverter controller comprises:
- a maximum power point tracking part for tracking a maximum power point with respect to the DC/AC inverter unit, using the output voltage and the output current from the photovoltaic cell, to generate a reference voltage in the second grid-connected control mode;
- a current command value calculation part for generating a current command value using the reference voltage generated by the maximum power point tracking part;
- a current compensation value calculation part for generating power by adding a predetermined FC power command value and a predetermined PV power command value, and for generating a current compensation value by dividing the generated power by voltage set according to the grid voltage;
- a current compensation part for compensating the current command value from the current command value calculation part, using the current compensation value from the current compensation value calculation unit; and
- a third PWM control part for generating a PWM inverter control signal by calculation using a detection current and the current command value compensated by the current compensation part, and for controlling the operation of the DC/AC inverter unit, using the PWM inverter control signal.

2. The PV-FC hybrid generation system of claim 1, wherein the DC link unit comprises a capacitor connected between a ground and a common connection node commonly connected to the output terminal of the PV DC/DC converter unit and the output terminal of the FC DC/DC converter unit.

3. The PV-FC hybrid generation system of claim 2, wherein the DC/AC inverter unit comprises:
- a DC/AC inverter for converting the DC voltage from the DC link unit into a pulsed voltage;
- a filter for converting the pulsed DC voltage from the DC/AC inverter into the AC voltage; and
- a grid transmitter for transmitting the AC voltage from the filter to a grid.

4. The PV-FC hybrid generation system of claim 1, wherein the hybrid generation control unit is configured to determine a photovoltaic generation status according to a PV power obtained by calculation using the PV output voltage and the output current from the photovoltaic cell after a grid-connected operation starts, and to perform one of predetermined first and second grid-connected control modes according to the determined photovoltaic generation status.

5. The PV-FC hybrid generation system of claim 1, wherein the PV converter controller comprises:
- a first calculation part for calculating a first control error value for constant voltage control on the PV DC/DC converter unit in the second grid-connected control mode;
- a first control value compensation part for compensating a PV converter control value using the first control error value from the first calculation part; and
- a first PWM control part for generating a PV PWM converter control signal, using the compensated PV converter control value from the first control value compensation part, and for controlling the operation of the DC/DC converter unit, using the PV PWM converter control signal.

6. The PV-FC hybrid generation system of claim 1, wherein the FC converter controller comprises:
- a second calculation part for calculating a second control error value for constant current control on the FC DC/DC converter unit in the second grid-connected control mode;
- a second control value compensation part for compensating an FC converter control value using the second control error value from the second calculation part; and
- a second PWM control part for generating an FC PWM converter control signal using the compensated FC converter control value from the second control value compensation part, and for controlling the operation of the FC DC/DC converter unit, using the FC PWM converter control signal.

7. The PV-FC hybrid generation system of claim 5, wherein the first calculation part of the PV converter controller is configured to perform PI control of a difference value between a predetermined DC voltage command value and the DC voltage to generate a DC command value, and to calculate the first control error value corresponding to a difference value between the DC command value and the output current from the FC DC/DC converter unit in the second grid-connected control mode.

8. The PV-FC hybrid generation system of claim 6, wherein the second calculation part of the FC converter controller is configured to generate an output current command value of an FC converter by dividing a predetermined power command value by the DC voltage, and to calculate the second control error value corresponding to a difference value between the output current command value of the FC converter and the output current from the FC converter in the second grid-connected control mode.

9. The PV-FC hybrid generation system of claim 1, wherein the current command value calculation part of the inverter controller is configured to perform PI control of a difference value between the PV output voltage and the reference voltage from the maximum power point tracking part to thereby generate a reference current, and to perform PI control of a difference value between the reference current and the PV output current to thereby generate the current command value.

10. The PV-FC hybrid generation system of claim 1, wherein the PV converter controller is configured to control termination of the operation of the PV DC/DC converter unit.

11. The PV-FC hybrid generation system of claim 1, wherein the FC converter controller comprises:
a second calculation part for calculating a second control error value for constant voltage control on the FC DC/DC converter unit in the first grid-connected control mode;
a second control value compensation part for compensating an FC converter control value using the second control error value from the second calculation part; and
a second PWM control part for generating an FC PWM converter control signal using the compensated FC converter control value from the second control value compensation part, and for controlling the operation of the FC DC/DC converter unit, using the FC PWM converter control signal.

12. The PV-FC hybrid generation system of claim 1, wherein the inverter controller comprises:
a current command value calculation part for generating a current command value by dividing a predetermined FC power command value by voltage set according to the grid voltage for grid connection and output current control on the DC/AC inverter unit in the first grid-connected control mode; and
a third PWM control part for generating a PWM inverter control signal by calculation using a detection current and the current command value from the current command value calculation part, and for controlling the operation of the DC/AC inverter unit, using the PWM inverter control signal.

13. The PV-FC hybrid generation system of claim 11, wherein the second calculation part of the FC converter controller is configured to perform PI control of a difference value between a predetermined DC voltage command value and the DC voltage to thereby generate an output current command value of the FC converter, and to calculate the second control error value corresponding to a difference value between the output current command value of the FC converter and the output current from the FC DC/DC converter unit in the first grid-connected control mode.

14. A method of controlling a photovoltaic and fuel cell (PV-FC) hybrid generation system having a PV DC/DC converter unit converting a PV output voltage from a photovoltaic cell into a predetermined voltage, an FC DC/DC converter unit converting an FC output voltage from a fuel cell into a predetermined voltage, a DC link unit linking the converted PV output voltage from the PV DC/DC converter unit to the converted FC output voltage from the FC DC/DC converter unit to thereby generate a DC voltage, and a DC/AC inverter unit converting the DC voltage from the DC link unit into a predetermined AC voltage, the method comprising:

a system start operation in which voltage and current necessary to determine grid connection are detected, and it is determined whether grid connection is obtainable or not on the basis of the detected voltage;

a grid-connected photovoltaic generation determination operation in which a grid-connected operation mode is performed when it is determined that the grid connection is obtainable, in order to determine a photovoltaic generation status by comparing a PV power obtained by calculation using the PV output voltage and output current from the photovoltaic cell with a predetermined minimum PV power;

a first grid-connected control operation including a first converter control operation in which an operation of the PV DC/DC converter is terminated, a second converter control operation in which a constant voltage of the FC DC/DC converter unit is controlled, and an inverter control operation in which grid connection and output current control on the DC/AC inverter unit are performed, when it is determined that photovoltaic generation is not being carried out in a grid-connected operation mode in the grid-connected photovoltaic generation determination operation; and a second grid-connected control operation having a first converter control operation in which constant voltage control on the PV DC/DC converter unit is performed, a second converter control operation in which constant current control on the FC DC/DC converter unit is performed, and an inverter control operation in which maximum power point tracking, grid connection and output current control on the DA/AC inverter unit are performed, wherein in each of the system start operation, the first grid-connected control operation, and the second grid-connected control operation, the FC output voltage and output current are detected from the fuel cell, the PV output voltage and output current are detected from the photovoltaic cell, output currents are detected from the PV DC/DC converter unit and the FC DC/DC converter unit, the DC voltage is detected from the DC link unit, the AC voltage and output current are detected from the DC/AC inverter unit, and a grid voltage is detected from a grid of a commercial power supply, and the inverter control operation of the second grid-connected control operation comprises:
a maximum power point tracking operation in which maximum power point tracking with respect to the DC/AC inverter is performed using the output voltage and the output current from the photovoltaic cell to generate a reference voltage;
a current command value calculation operation in which a current command value is generated using the reference voltage generated in the maximum power point tracking operation;
a current compensation value calculation operation in which power is generated by adding a predetermined FC power command value and a predetermined PV power command value, and the power is divided by voltage set according to the grid voltage to generate a current compensation value;
a current compensation operation in which the current command value calculated in the current command value calculation operation is compensated using the current compensation value calculated in the current command value calculation operation; and
a third PWM control operation in which a PWM inverter control signal is generated by calculation using a detection current and the current command value compensated in the current compensation operation, and an operation of the DC/AC inverter is controlled using the PWM inverter control signal.

15. The method of claim 14, wherein the first converter control operation of the second grid-connected control operation comprises:
   a first calculation operation in which a first control error value is calculated for constant voltage control on the PV DC/DC converter unit;
   a first control value compensation operation in which a PV converter control value is compensated using the first control error value calculated in the first calculation operation; and
   a first PWM control operation in which a PV PWM converter control signal is generated using the PV converter control value compensated in the first control value compensation operation, and the operation of the PV DC/DC converter unit is controlled using the PV PWM converter control signal.

16. The method of claim 14, wherein the second converter control operation of the second grid-connected control operation comprises:
   a second calculation operation in which a second control error value is calculated for constant current control on the FC DC/DC converter unit;
   a second control value compensation operation in which an FC converter control value is compensated using the second control error value calculated in the second calculation operation; and
   a second PWM control operation in which an FC PWM converter control signal is generated using the FC converter control value compensated in the second control value compensation operation, and the operation of the FC DC/DC converter unit is controlled using the FC PWM converter control signal.

17. The method of claim 15, wherein in the first calculation operation of the first converter control operation, PI control of a difference value between a predetermined DC voltage command value and the DC voltage is performed to generate a DC command value, and the first control error value corresponding to a difference value between the DC command value and the output current from the PV DC/DC converter is calculated.

18. The method of claim 16, wherein in the second calculation operation of the second converter control operation, an output current command value of an FC converter is generated by dividing a predetermined power command value by the DC voltage, and the second control error value corresponding to a difference value between the output current command value of the FC converter and output current from the FC converter is calculated.

19. The method of claim 14, wherein in the current command value calculation operation of the inverter control operation, PI control of a difference value between the PV output voltage and the reference voltage generated in the maximum power point tracking operation is performed to generate a reference current, and PI control of a difference value between the reference current and the PI output current is performed to generate the current command value.

20. The method of claim 14, wherein the second converter control operation of the first grid-connected control operation comprises:
   a second calculation operation in which a second control error value is calculated for constant voltage control on the FC DC/DC converter unit;
   a second control value compensation operation in which an FC converter control value is compensated using the second control error value calculated in the second calculation operation; and
   a second PWM control operation in which an FC PWM converter control signal is generated using the FC converter control value compensated in the second control value compensation operation, and the operation of the FC DC/DC converter unit is controlled using the FC PWM converter control signal.

21. The method of claim 14, wherein the inverter control operation of the first grid-connected control operation comprises:
   a current command value calculation operation in which a current command value is generated by dividing a predetermined FC power command value by voltage set according to the grid voltage for grid connection and output current control on the DC/AC inverter unit; and
   a third PWM control operation in which a PWM inverter control signal is generated by calculation using a detection current and the current command value calculated in the current command value calculation operation, and the operation of the DC/AC inverter unit is controlled using the PWM inverter control signal.

22. The method of claim 14, wherein in the second calculation operation of the second converter control operation, PI control of a difference value between a predetermined DC voltage command value and the DC voltage is performed to generate an output current command value of the FC converter, and a second control error value corresponding to a difference value between the output current command value of the FC converter and the output current form the FC DC/DC converter unit is calculated.

* * * * *